(12) United States Patent
Filler et al.

(10) Patent No.: US 12,390,976 B2
(45) Date of Patent: Aug. 19, 2025

(54) SIGNALING ARRANGEMENTS EMPLOYING MOLDED THERMOPLASTICS

(71) Applicant: Digimarc Corporation, Beaverton, OR (US)

(72) Inventors: Tomas Filler, Beaverton, OR (US); Vojtech Holub, Lafayette, CO (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 17/952,066

(22) Filed: Sep. 23, 2022

(65) Prior Publication Data

US 2023/0096859 A1     Mar. 30, 2023

Related U.S. Application Data

(60) Provisional application No. 63/267,268, filed on Jan. 28, 2022, provisional application No. 63/265,487, (Continued)

(51) Int. Cl.
*B29C 49/42* (2006.01)
*B29C 33/38* (2006.01)
(Continued)

(52) U.S. Cl.
CPC .... *B29C 49/42412* (2022.05); *B29C 33/3842* (2013.01); *B29C 49/48* (2013.01); *B29L 2031/7158* (2013.01)

(58) Field of Classification Search
CPC ......... B29C 49/42; B29C 33/38; B29C 49/48; B29C 49/42412; B29C 33/3842; B29L 2031/7158
See application file for complete search history.

(56) References Cited

U.S. PATENT DOCUMENTS 5,389,332 A * 2/1995 Amari ................. B29C 49/6445
                                                           425/529
5,788,926 A * 8/1998 Oda .................... B29C 49/0005
                                                           264/515
(Continued)

FOREIGN PATENT DOCUMENTS

EP    2983885 B1    5/2018
EP    3391102 B1    1/2021
(Continued)

OTHER PUBLICATIONS

VDI 3400 Surface Finishes by Mold & Molding (Year: 2023).*
(Continued)

*Primary Examiner* — Alison L Hindenlang
*Assistant Examiner* — Shibin Liang
(74) *Attorney, Agent, or Firm* — Klarquist Sparkman, LLP

(57) ABSTRACT

A thermoplastic resin is molded to define a container bearing a surface 2D code signal, such as a digital watermark pattern. In some arrangements, the mold dimensions are tailored, and process parameters are selected, so that an indentation in the mold gives rise to a corresponding indentation—rather than a corresponding protrusion—in the shaped plastic. In other arrangements, a metal mold is provided with a patterned resin on its surface to define the 2D code signal. The resin may take the form of a rigid or non-rigid insert that can be removed or re-worked to change the code signal without changing the metal mold. A variety of other improvements and arrangements are also detailed.

22 Claims, 19 Drawing Sheets

Related U.S. Application Data filed on Dec. 15, 2021, provisional application No. 63/274,661, filed on Nov. 2, 2021, provisional application No. 63/253,861, filed on Oct. 8, 2021, provisional application No. 63/261,837, filed on Sep. 29, 2021, provisional application No. 63/248,479, filed on Sep. 25, 2021.

(51) Int. Cl.
  *B29C 49/48*  (2006.01)
  *B29L 31/00*  (2006.01)

(56) References Cited

U.S. PATENT DOCUMENTS

| | | | |
|---|---|---|---|
| 6,390,368 B1 * | 5/2002 | Edwards | B29C 49/52 |
| | | | 235/494 |
| 6,608,919 B1 | 8/2003 | Alattar | |
| 7,745,103 B2 | 6/2010 | Yoneshima | |
| 8,794,951 B2 | 8/2014 | Yoneshima | |
| 9,174,365 B2 | 11/2015 | Yoneshima | |
| 9,434,094 B2 | 9/2016 | Kenichi | |
| 2009/0220789 A1 * | 9/2009 | DeSimone | B82Y 10/00 |
| | | | 528/401 |
| 2012/0104660 A1 | 5/2012 | Disawal | |
| 2021/0101711 A1 | 4/2021 | Brown | |
| 2021/0387399 A1 | 12/2021 | Filler | |

FOREIGN PATENT DOCUMENTS

| | | |
|---|---|---|
| EP | 4079482 | 10/2022 |
| WO | 2011087140 A1 | 7/2011 |
| WO | 2013165415 | 11/2013 |
| WO | 2020186234 | 9/2020 |
| WO | 2021195563 | 9/2021 |

OTHER PUBLICATIONS

Publication WO 2023049400 of related PCT application US2022/044607 dated Mar. 30, 2023 (including International Search Report, and Amended Claims with Statement); together with related Invitation to Pay Additional Fees; Partial International Search; Provisional Opinion Accompanying the Partial Search Result; Written Opinion of the International Searching Authority; and International Preliminary Report on Patentability.
JP2001062842A with machine translation, 2001.
JP2002219715A with machine translation, 2002.
Weatherhead, Fibre Reinforced Resin Systems, Springer Netherlands, 2012, excerpt.
Correspondence in application PCT/US2022/044607 (corresponding to U.S. Appl. No. 17/952,066), including Invitation to Pay Additional Fees, Communication Relating to the Results of the Partial International Search, and Provisional Opinion Accompanying the Partial Search Result, Dec. 16, 2022.
Further correspondence in application PCT/US2022/044607 (published as WO2023049400, corresponding to U.S. Appl. No. 17/952,066).

* cited by examiner

141
REFERENCE SIGNAL COMPONENT

142
INTERPOLATED PAYLOAD COMPONENT

144
REFERENCE + 0.1253(PAYLOAD)

SIGNALING ARRANGEMENTS EMPLOYING MOLDED THERMOPLASTICS

RELATED APPLICATION DATA

This application claims priority to U.S. provisional applications 63/267,268, filed Jan. 28, 2022, 63/265,487, filed Dec. 15, 2021, 63/274,661, filed Nov. 2, 2021, 63/253,861, filed Oct. 8, 2021, 63/261,837, filed Sep. 29, 2021, and 63/248,479, filed Sep. 25, 2021.

The subject matter of this application is also related to, and expands on that of, pending U.S. patent application Ser. No. 17/347,358, filed Jun. 14, 2021 (published as 20210387399), Ser. No. 17/721,694, filed Apr. 15, 2022, Ser. No. 17/214,455, filed Mar. 26, 2021 (published as 20210299706), Ser. No. 17/393,227, filed Aug. 3, 2021 (published as 20220027590), Ser. No. 17/835,775, filed Jun. 8, 2022, Ser. No. 16/944,136, filed Jul. 20, 2020, Ser. No. 17/339,711, filed Jun. 4, 2021 (published as 20210390358), Ser. No. 16/405,621, filed May 7, 2019 (published as 20190332840), and 63/240,821, filed Sep. 3, 2021.

The above applications are incorporated herein by reference.

INTRODUCTION

The earlier-cited patent applications disclose the use of molds to both shape plastic items and also to impart textures to item surfaces to encode machine-readable codes, e.g., watermark patterns. Such codes convey plural symbols of data that can indicate item identity, item contents, information about item recycling, etc.

FIG. 1 shows an excerpt of a mold 10 that has been shaped, by drilling, laser shaping, chemical etching, electrical discharge machining, CNC, or otherwise (collectively referenced as "milling" herein), to include a pattern of cavities or voids 12. This pattern comprises the machine-readable code. When plastic is shaped by such a mold, the plastic is driven—here by air pressure 16 applied from above—to extend into such holes. After release, the molded item has a series of surface protrusions corresponding to those holes.

Inversely, a mold can be shaped to include spikes extending out from the mold surface (rather than cavities extending into the mold surface) to form indentations (rather than protrusions) in shaped plastic.

For most watermark patterns, the scales of the elemental marks (e.g., corresponding to the mold cavities or spikes) are of a very fine dimension, e.g., 250 microns.

Prior art arrangements for molding plastics to convey watermark patterns have suffered in certain respects. For example, very fine spikes used to form corresponding indentations in molded plastic surfaces degrade rapidly with use, limiting the service life of such molds and necessitating frequent replacement. Similarly, the finely-detailed features comprising watermark patterns can be laborious to mill in the metal mold, raising costs.

Certain aspects of the technology described below redress these and other difficulties of the prior art, and provide additional advantages.

One such aspect concerns methods of molding plastic to form indentations. Rather than employing a mold with protruding spikes, a mold with cavities is used instead. That is, indentations in a mold act to form corresponding indentations in the plastic.

This peculiar result is found to depend based on opening dimensions of the cavities. In a particular implementation, mold cavities having opening dimensions of 240 microns or less span, in the aggregate, a majority of the total surface area spanned by all cavities. In other implementations, cavities of still smaller dimensions (e.g., 180, 160, 140 microns or less) collectively span a majority of the total surface area spanned by all cavities. Usually, the majority of mold cavities have opening dimensions of at least 100 microns. (This majority typically comprises 75% or more, or 90% or more, of the total mold surface area spanned by all cavities.)

This outcome is also found to depend on the blowing pressure, with such results arising with blowing pressures of between 3 and 10 bar.

This outcome is most-reliably produced when smoother mold surfaces are employed, e.g., molds having surface roughnesses of less than 1.6, or 0.8, microns.

In one exemplary implementation, mold cavities having opening dimensions of 100-160 microns span, in the aggregate, a majority of the total surface area spanned by all cavities of the mold. Blow-molding of the item with HDPE or LDPE plastic is performed, using a blowing pressure of 3-6 bars.

Another aspect concerns a mold for impressing plastic items with digital watermark patterns, comprising a base metal member that defines a general shape of an item, and an insert that defines a digital watermark pattern. The insert can be replaced, or re-shaped, to define a different digital watermark pattern.

The foregoing and other features of the present technology will be more readily apparent from the following detailed description, which proceeds with reference to the accompanying drawings.

DETAILED DESCRIPTION

Figure 1:
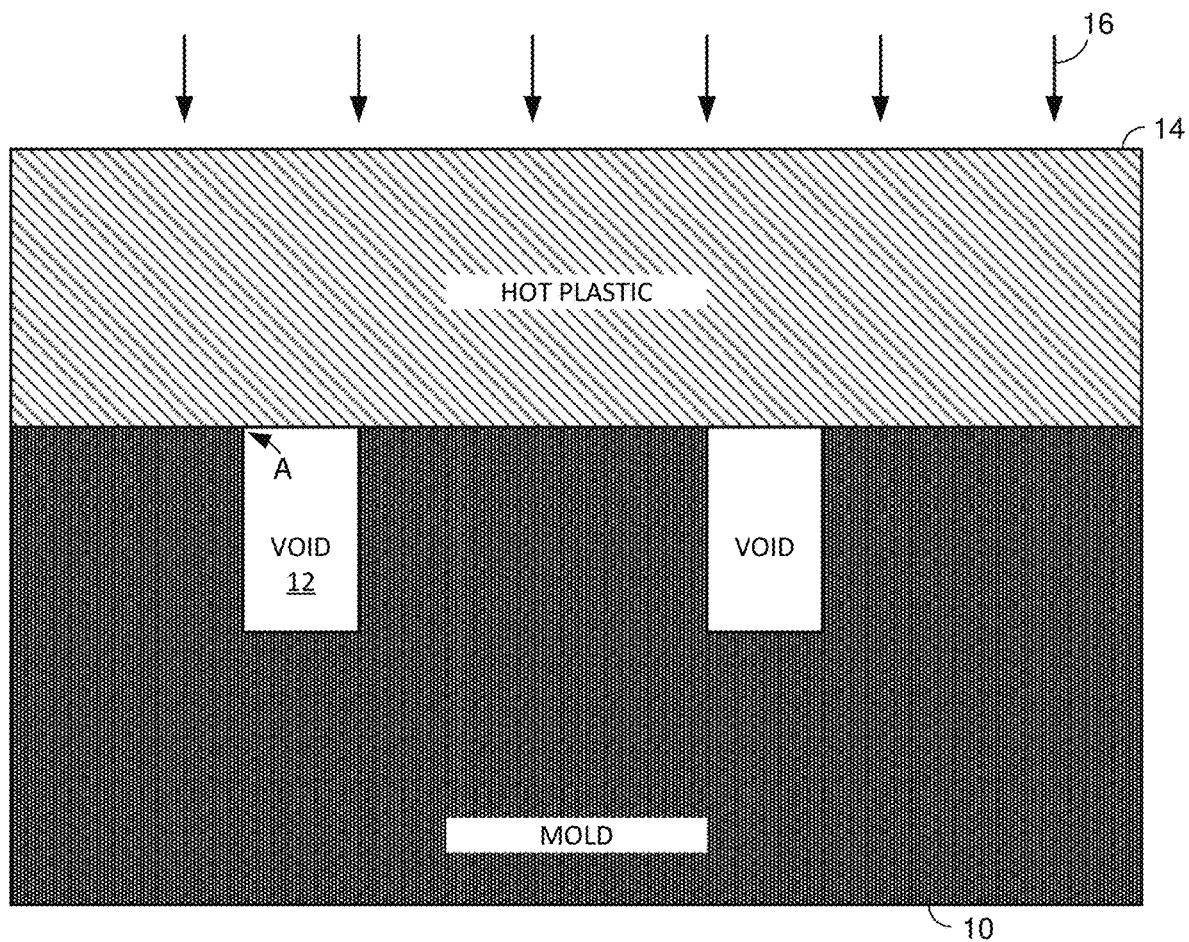
FIG. 1 shows an arrangement in which hot plastic is pressured-urged against a mold including voids.

Before proceeding further, it is helpful to review certain aspects of watermark technology. As detailed in cited U.S. publication 20190332840, an illustrative binary watermark pattern is a derivative of a so-called continuous tone watermark signal (pattern). The continuous tone pattern has two parts: a synchronization signal (sometimes termed a "reference signal") and a message signal. The synchronization signal is a summation of many 2D sinusoids (e.g., 16, 24 or 64) of different frequencies and phases. (Integer frequencies are desirably used, to permit seamless tiling of resultant blocks to span arbitrarily large areas of substrate.) When imagery depicting such pattern is transformed into a spatial frequency domain (as by a fast Fourier transform), the individual sinusoid components form a constellation of points in the (u,v) plane. The scale and rotation of this constellation, as compared to original values, reveal the scale and rotation at which the watermark pattern is depicted in the imagery. The phases of these points in the (u,v) plane indicate the translation, in x- and y-directions, at which the watermark pattern is depicted in the imagery. U.S. Pat. Nos. 6,590,996, 9,959,587 and 10,242,434 provide further information on these and other topics.

The message signal part of an exemplary continuous tone watermark pattern starts with a binary message, e.g., of 47 bits, which is concatenated with 24 corresponding CRC bits, and then convolutionally-encoded with a base rate of 1/13 to yield a series of 924 bits. 100 further bits, indicating a version identifier, are appended, yielding 1024 "signature" bits. Each of these bits is modulated with a sixteen element bipolar {+1/−1} noise sequence, yielding 16 bipolar "chips." Each of these chips is mapped to a different location within a 128×128 location array by a scatter table (i.e., one "chip" for each of the 16,384 locations).

The 2D synchronization and message signals are combined by first sampling the synchronization signal at 16,384 uniformly-spaced points corresponding to the 128×128 message signal array. At each location a weighted sum is formed between the synchronization signal value (which may be a floating-point number ranging between −1 and +1) and the chip value (−1 or +1) at each point. An 8:1 weighting is exemplary, with the synchronization signal dominating. The resultant weighted sum can be scaled, e.g., to a range of −1 to +1, and forms the continuous tone watermark signal. (The signal is termed "continuous tone" since it is based on a floating-point range of values. However, in some embodiments the signal may be quantized, e.g., to 8-bit greyscale values centered at 128.) More generally, a continuous-tone watermark signal is one in which waxel values are not simply binary; there are one or more intermediate values between the highest and lowest waxel values.

From such a continuous tone watermark signal, or its two original components, a corresponding binary watermark pattern can be derived by various techniques, as detailed in U.S. publication 20190332840.

One technique is simply to apply a thresholding operation, identifying the locations in the continuous tone watermark having the lowest (darkest) values (i.e., the most-negative, in the case of values between −1 and +1, or the values closest to zero in an 8-bit greyscale representation). Each such low-valued location is binarily marked, e.g., with a dark mark. Other locations are left unmarked (e.g., with the opposite binary state, such as white). By varying the threshold, the binary watermark pattern can be made darker or lighter (i.e., by increasing or decreasing the number of marks). Such a watermark pattern may be termed a simply-thresholded binary watermark.

A second technique starts with the two separate 128×128 inputs. One is a synchronization signal block, with floating point values between −1 and +1, sampled at a 128×128 array of points. The other is the 128×128 array of payload chip values, having values of black and white (i.e., −1 and +1, or 0 and +1). The darkest (most negative) "x"% of the synchronization signal locations are identified, and binarily marked (e.g., set to black); the others are set to the opposite binary state (e.g., white). Spatially-corresponding elements of the two blocks are ANDed together to find coincidences of black elements between the two blocks. Marks (e.g., dark marks) are formed in an output block at these locations of black coincidence; the other locations in the 128×128 array are left unmarked (e.g., white). By setting the value "x" higher or lower, the output signal block can be made darker or lighter. Such a code may be termed an ANDed, or a Type 1, binary watermark.

Another binary marking technique samples the 2D synchronization signal not in a 128×128 array, but at a higher resolution—such as a resolution at which the pattern will ultimately be rendered. For example, if the pattern will be rendered to span a square that is 1.1 inches on a side, with a rendering resolution of 1200 ppi, then the synchronization signal is sampled in a 1320×1320 array. The 128×128 array of −1/+1 payload chip values is also processed to match this 1320×1320 array size, e.g., using bilinear interpolation, which results in conversion of the binary chip values to floating point values between −1 and +1. These two components are weighted (as above) and summed. The N locations having the lowest values, within the summed 1320×1320 array, are identified for marking. (The location values may be thresholded to identify which should be marked. Alternatively, locations may be chosen in order, lowest-first, until a desired number of locations have been identified for marking.) Such a code may be termed an interpolated, or a Type 2, binary watermark.

Yet another binary marking technique sorts samples within a 128×128 array of synchronization signal samples by value (darkness), yielding a ranked list of the darkest N locations (e.g., 1600 locations), each with a location within the 128×128 array. The darkest of these N locations may be always-marked in an output block (e.g., 400 locations, or P locations), to ensure the synchronization signal is strongly expressed. The others of the N locations (i.e., N-P, or Q locations) are marked, or not, depending on values of message signal data (chips) that are mapped to such locations (e.g., by a scatter table in the encoder). Locations in the sparse block that are not among the N darkest locations (i.e., neither among the P or Q locations) are not selected for marking (although they may be traversed by an energized laser), and they are consequently affirmatively ignored by the decoder. By setting the number N larger or smaller, sparse marks with more or fewer dots are produced. This embodiment may also be termed a Type 3 binary watermark.

These and other techniques are further detailed in U.S. publication 20190332840.

It will be recognized that the greater the number of locations selected for marking, the more faithfully the binary watermark signal will mimic, or approximate, the corresponding continuous tone watermark signal to which it corresponds. But there is a point of diminishing returns, and selection of additional points eventually becomes a hindrance rather than a help (e.g., as the entire area of the watermark becomes flooded with adjoining marks).

We sometimes refer to "dot density" of a binary mark to indicate the relative darkness of the marking pattern. In an array of 128×128 locations (corresponding to the 16,384 binary chip values) up to about 8,192 locations might be marked with dots (marks). We term this a dot density of 100, i.e., 100% of candidate dot locations are marked. A dot density of 20 indicates 20% of 8,192 locations are marked, or about 1600 marks. Dot densities of between about 2 and 30 are most commonly used (as a compromise between visibility and signal robustness), which correspond to between about 150 and 2500 marks in a single watermark block. (Such blocks may be tiled edge-to-edge to span an area of arbitrary size.)

Robustness of watermark patterns, like those just-described, can be assessed by adding increasing levels of Gaussian noise to imagery depicting a watermark pattern, to determine the noise level at which correct payload decoding falls below 50%. The larger this noise level at which the payload can still be correctly decoded 50% of the time, the more robust is the watermark pattern. Such assessments are performed over dozens or hundreds of trials, and averaged, to yield a reliable metric. See, e.g., U.S. Pat. No. 10,217,182.

Figure 2:
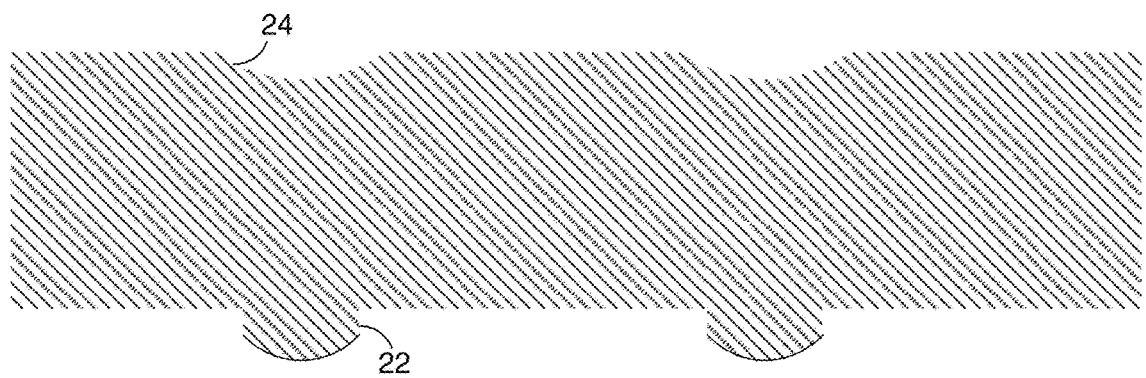
FIG. 2 shows a desired configuration of a shaped plastic.
Figure 3:
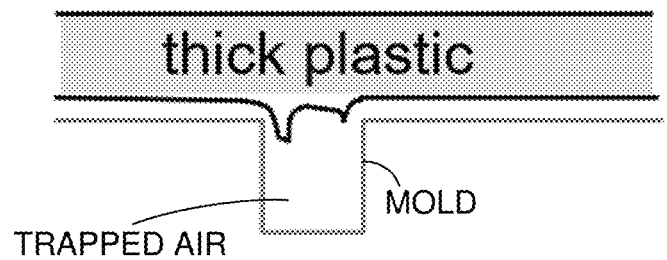
FIG. 3 illustrates a result produced by certain previous molding processes.
Figure 4:
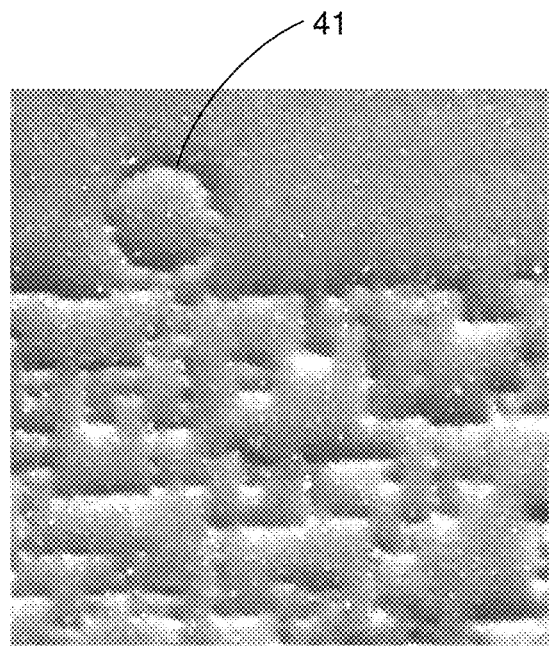
FIG. 4 is an enlarged photograph of a pattern produced by a previous molding process.
Figure 5:
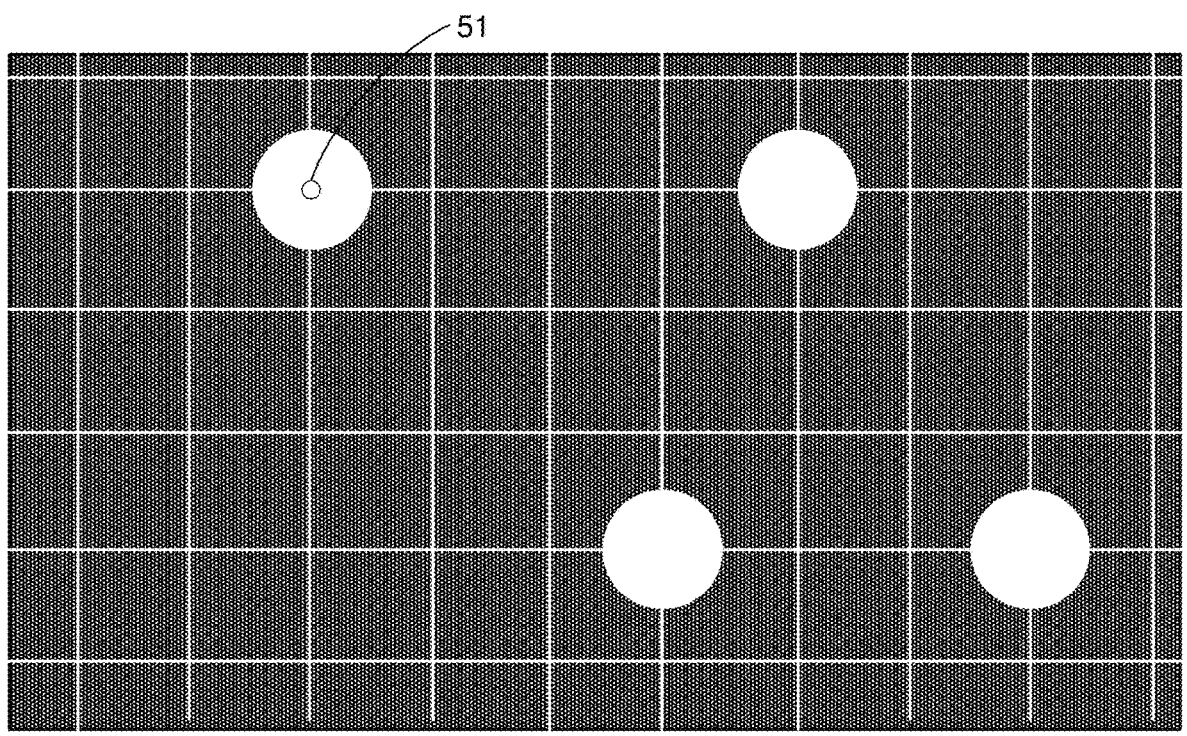
FIG. 5 shows an array of thin channels that allow plural mold voids to vent through a shared vent hole.
Figure 6:
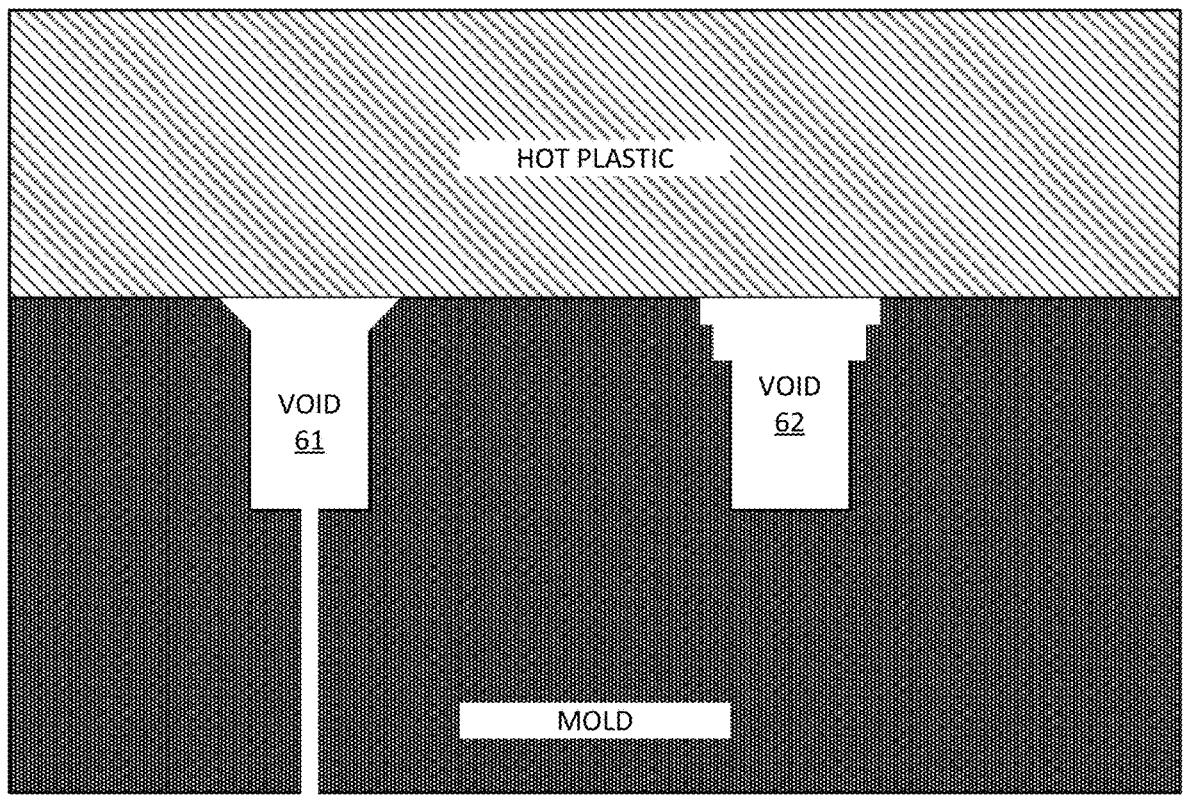
FIG. 6 shows two variant entrances to the mold voids of FIG. 1.
Figure 7A:
FIG. 7A is a cross section of a cone-shaped spike.
Figure 7B:
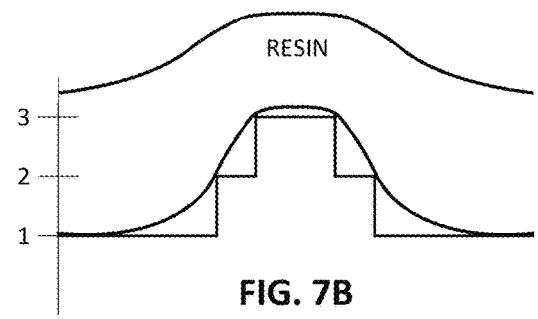
FIG. 7B is a cross-section of an approximation of the FIG. 7A spike that may be realized by selectively milling the mold to assume one of three different levels, together with shaped plastic resin on top of the mold.
Figure 8A:
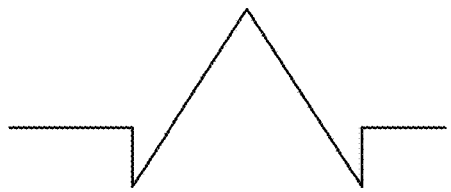
FIG. 8A is a cross section of a cone-shaped spike with a moat.
Figure 8B:
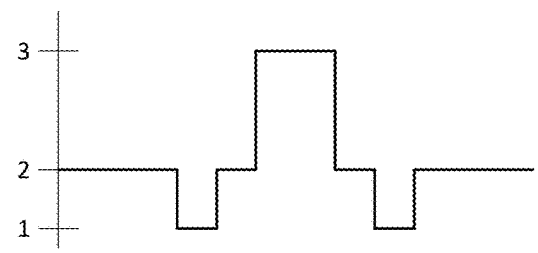
FIG. 8B is a cross-section of an approximation of the FIG. 8A spike that may be realized by selectively milling the mold to assume one of three different levels.
Figure 8C:
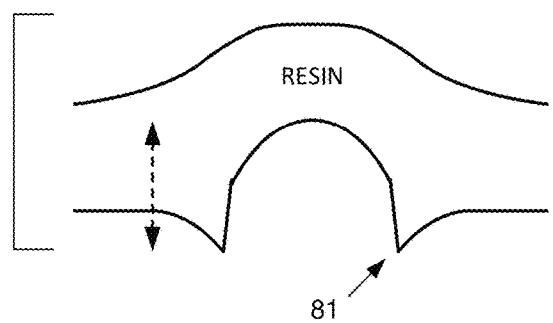
FIG. 8C illustrates how the mold of FIG. 8B can shape plastic resin to include a downwardly-protruding lip or ring, which accentuates a height of a recess formed by the FIG. 8B spike.
Figure 8D:
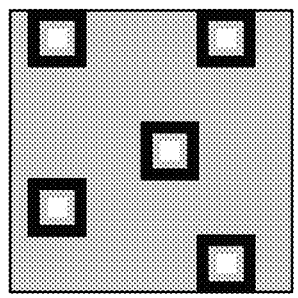
FIG. 8D is an illustration of a ternary digital artwork file that indicates, by different values (colors), the different elevations to which the mold surface is to be milled.
Figure 9A:
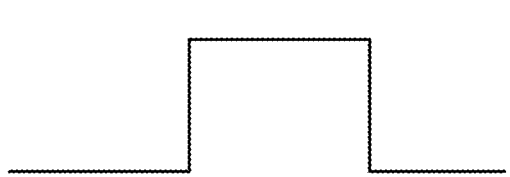
FIG. 9A is a cross section of a cuboid-shaped spike.
Figure 9B:
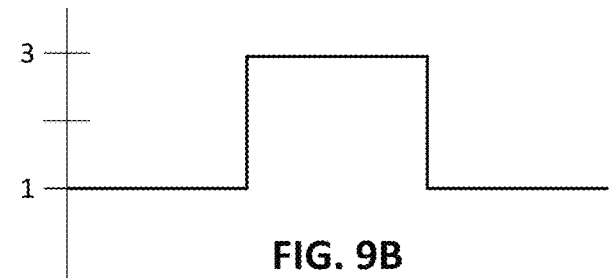
FIG. 9B shows how the FIG. 9A spike can be identically realized by selectively milling the mold to one of two elevations.
Figure 10A:
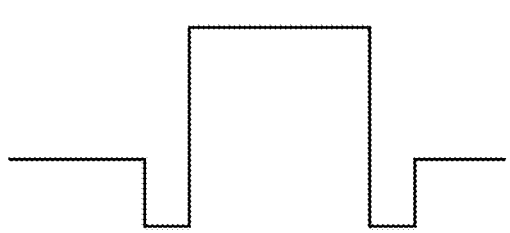
FIG. 10A is a cross section of a cuboid-shaped spike with a moat.
Figure 10B:
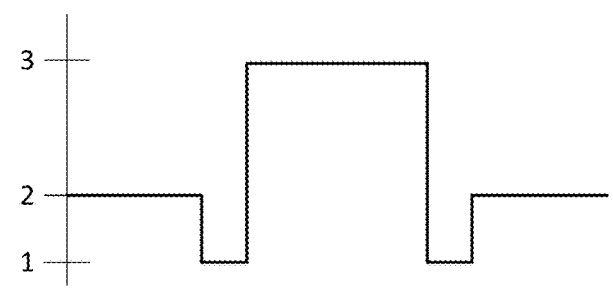
FIG. 10B shows how the FIG. 10A spike can be identically realized by selectively milling the mold to one of three elevations.
Figure 11:
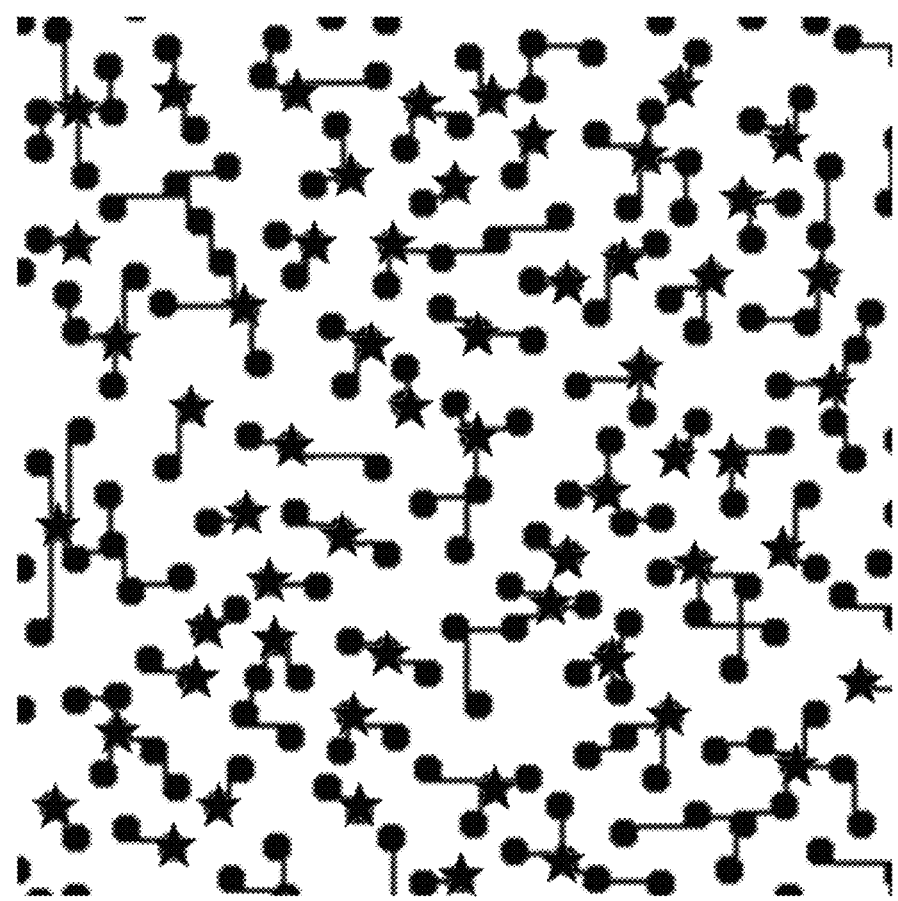
FIG. 11 is a map template showing locations of spikes, air channels linking the spikes, and star-indicated vent holes, in an illustrative arrangement.
Figure 12:
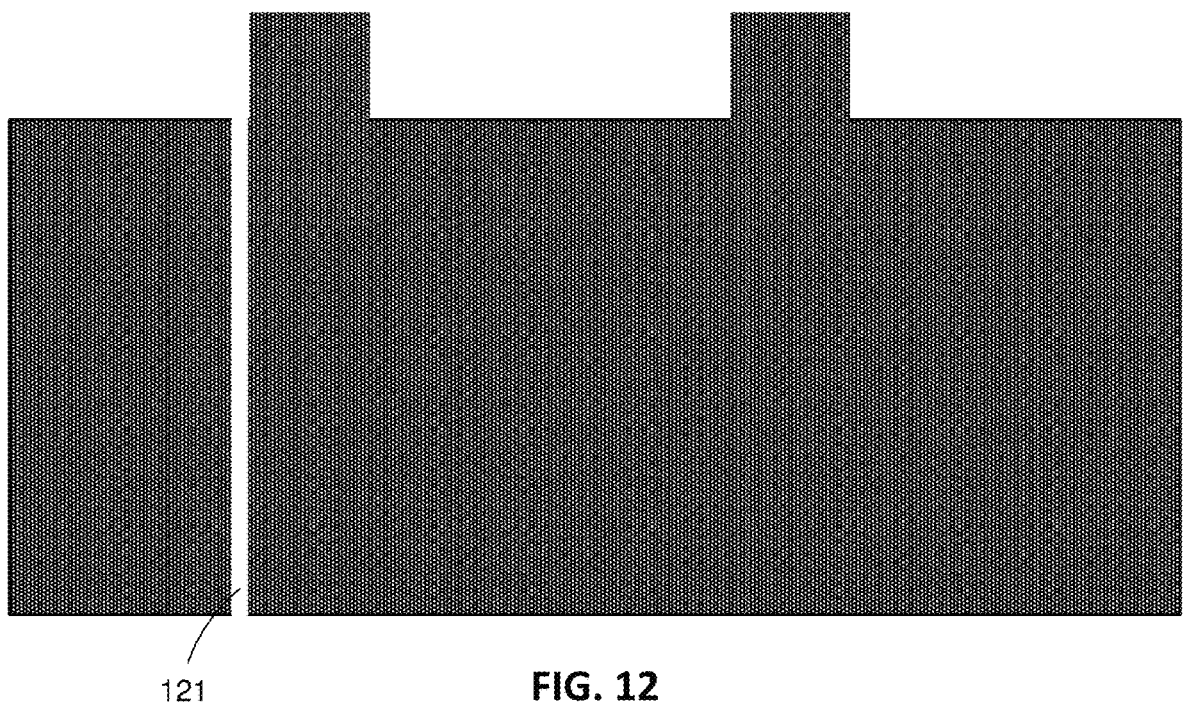
FIG. 12 shows a mold with spike protrusions, one of which has an adjoining vent hole.

It can be desirable for molded plastic protrusions resulting from the molding process to have smooth, generally hemispherical shapes, as shown by protrusions 22 in FIG. 2. Each would cause illumination from an incident a light source to reflect in different directions from different parts of the smooth, hemispherical surface. Imagery could then be captured depicting such reflections, and decoded to extract the code corresponding to the original pattern of holes in the mold.

It is also sometimes desirable for such protrusions 22 to be mirrored by reciprocal depressions (recesses) 24 on the opposite side of the shaped resin, so that imagery from the opposite side of the plastic could be similarly-processed.

In an illustrative embodiment the holes in the mold surface are cavities of square or round cross-section, having a depth of about 0.3 or 0.5 mm (0.012 or 0.02 inches). Each cavity may be, e.g., 0.15 or 0.2 mm (0.006 or 0.0079 inches) in width. The plastic being shaped may be a clear or opaque (e.g., black) PET resin that is, e.g., 0.2 or 0.4 mm in thickness (0.0079 or 0.016 inches).

FIGS. 3-6, 7A-7B, 8A-8D, 9A-9B, 10A-10B, and 11-13 illustrate various arrangements, e.g., connected binary patterns, that are detailed in our published application US20210387399. (Attached to U.S. priority application 63/076,917 is sample Matlab code illustrating aspects of connected binary patterns.) The arrangements illustrated in these figures can be used in conjunction with the technologies detailed below.

Resin Mold Shaping Molding of code patterns on plastic items commonly involves milling a mold that is made of, e.g., aluminum or steel. Such metal processing can involve expensive equipment and can be time-consuming—sometimes taking hours or days in the case of a metal mold having a large surface area that is to be worked to form the fine details of repeated code patterns.

To reduce such difficulties, a base metal mold can be provided with a surface design layer coded insert that is more easily shaped than the metal of the mold, but yet is durable enough to meet the service requirements of the plastic molding process. In one particular embodiment, the design layer comprises a heat-resistant thermosetting composite material including a synthetic resin, ceramic particulates and/or inorganic fibers, and a dilution solvent. This design layer can be shaped to convey a 2D machine readable code much more quickly and inexpensively than would be required to shape a metal mold.

The thickness of the design layer insert depends on the scale of features to be formed; the layer thickness must be at least as large as the largest surface variation to be formed on the molded plastic part (else machining of the base metal mold body would be required). A thickness between 1 and 50 microns is exemplary when the mold is to be used in an injection molding process that is to form codes on an item, with a thickness between 5 and 30 microns often being typical. For molds used to form codes by thermoforming or blow molding, thicker design layers are generally used, e.g., ranging between 50 and 1500 microns. (Blow molding is understood to encompass extrusion blow molding, injection blow molding, and injection stretch blow molding.)

The resin can take various forms, depending on particular application requirements. Suitable resins include epoxy resin, acrylic resin, polyacetal resin, polyamide resin, polyimide resin, polyurethane resin, polyester resin, polyethylene resin, polycarbonate resin, polypropylene resin, silicon resin, fluorine resin, and/or melamine resin. Resins such as urea resin, phenol resin, phthalic acid resin, styrene resin, fibrous resin, vinyl chloride resin, and vinyl acetate resin are also suitable examples.

The ceramic particulates are included to impart strength to the design layer, particularly to resist compressive force. Porous aluminum oxide (alumina ceramic) granules are suitable, as are granules of titanium dioxide. The dimensions of the granules can vary with the thickness of the design layer, with larger granules typically being used with thicker layers. Particle sizes as small as 0.1 microns can be used, up to about 70 microns, with particles of between 10 and 20 microns being exemplary. In an illustrative embodiment the ceramic particulates comprise between 45 and 65% of the resin formulation.

The dilution solvent can be an organic solvent such as ethyl cellosolve monoacetate (Cellosolve). Since the solvent is volatile during production, it is not limited to the ethyl cellosolve monoacetate, and various known volatile solvents can be applied. It will be understood that this solvent is present only when the design layer is first applied to the base metal mold body. As the layer cures, the solvent is volatilized and essentially none thereafter remains.

The design layer insert can also include inorganic fibers, for further tensile strength. Glass fiber, carbon fiber, potassium titanate fibers and silicon carbide fiber are suitable. The dimensions of the fibers can again vary, typically with the thickness of the design layer, with longer, larger fibers commonly being used with thicker layers. The diameter of the fibers can range from, e.g., 0.05 microns up to 1.5 microns. The lengths of the fibers can range from, e.g., 1 to 200 microns. The density of the fibers may decrease with distance from the base metal mold body. This can be achieved by applying the design layer insert as several thin "skins"—each with a different proportion of fibers.

We sometimes refer to the particulates and fibers, collectively, as aggregates.

In some embodiments a top coat is applied to the design layer insert to form a desired glossiness of finish, which may be, e.g., polished or matte. This layer can be devoid of fibers and particulates, and may comprise, e.g., phenol resin, alkyd resin, melamine urea resin, epoxy resin, polyurethane resin, silicone resin, rubber chloride-based wood fat, vinyl acetate resin, acrylic resin, vinyl chloride resin or fluorine resin. This top coat can be applied before the design layer insert is shaped to define the code, or after such shaping.

The resin insert is typically applied to the metal mold body by spraying one or more layers of the resin/aggregate formulation onto the base metal mold body. However, other methods can be used as well—including extruding a sheet of partially-cured formulation, and applying it by pressure. Alternatively, a partially-cured sheet can be installed in a base mold by centrifugal action.

Curing of the resin formulation can take place in stages. A first, temporary stage can be conducted at a temperature of 80° C. until the resin reaches a desired stable consistency (dryness). A main curing stage is conducted by heating at 150° C. for 2-3 hours. A conventional heating furnace can be used. If multiple layers of resin formulation are applied to the mold, each can be subjected to the temporary curing stage. Then, after all layers are in place, the main curing can be performed.

After curing, the mold insert can be polished, CNC-machined, or laser processed, to assure that the surface of the design layer is suitably smooth and/or is of uniform thickness.

Working of the design layer to provide a code pattern of indentions (depressions) and/or protrusions (bumps) can be accomplished in different stages of the process, in different manners. While the resin is still deformable, a pattern of indentations can be impressed into the resin by a shaped surface that is formed, e.g., by 3D printing.

In one such arrangement, most of the surface area of the design layer surface is left unchanged; the depressions occupy less than 50% (and in some embodiments less than 15%, 5% or 2%) of the design layer area.

When the resin is deformable, or after it is fully cured, a pattern of protrusions can be formed by applying additional material to the resin surface, e.g., by 3D printing. Again, in one such arrangement, most of the surface area of the design layer surface is left unchanged; the protrusions occupy less than 50% (and in some embodiments less than 15%, 5% or 2%) of the design layer area.

Similarly, when the resin is deformable, or after it is cured, depressions can be formed in the design layer by laser- or CNC-machining, or photo-etching (chemical engraving), to cause corresponding bumps to be formed in the plastic items produced using such mold. In one such arrangement, most of the surface area of the design layer surface is left unchanged; the depressions occupy less than 50% (and in some embodiments less than 15%, 5% or 2%) of the design layer area.

By the just-noted processes, the surface area of the design layer can be removed in large part (typically down to a predetermined depth, but not completely through), leaving isolated prominences to remain. In one such arrangement most of the surface area of design layer is removed, with the remaining prominences occupying less than 50% (and in some embodiments less than 15%, 5% or 2%) of the design layer surface area.

It will be understood that in other embodiments a top level of design layer surface can be removed across up to its entire extent, with depressions and/or prominences defined by further removal of material down to deeper levels. In such case, the areas of further removal to define depressions typically total less than 50%, 15%, 5% or 2% of the coded insert area. Similarly, the areas of further removal to define remaining protrusions typically span 50% or more of the coded insert area, with 85%, 95% or 98% figures characterizing some embodiments.

Laser shaping of the resin insert can be performed using a 20 watt CO2 laser. In contrast, lasers needed to form code patterns in aluminum or steel conventionally operate with much higher powers—often in excess of 100 watts.

Each depression (prominence) in the surface can represent a single mark in a 2D machine-readable code. Alternatively, a grouping of depressions (prominences) can express a single mark. For example, 4 or 40, or 400 depressions (prominences) may be formed within a round or square region on the resin layer having a width of between 20 and 500 microns, to express a single dot of a dot-based code.

Either after or before shaping of the design layer with the code pattern, a top coat layer can be applied. If applied after shaping of the design layer then this top coat layer tends to smooth and round the indentation and/or protrusion features, which can later aid in plastic release.

The finished mold, with the shaped mold insert, is then used to form plastic items by techniques such as thermoforming, blow-molding and injection-molding.

Arrangements akin to those described above have been used to produce "shibo" finishes on consumer items. "Shibo" is a Japanese term for the crepe or pebbly pattern effect seen in certain textiles and leathers. Such pebbly, leather-mimicking finishes are used, for example, in texturing many automotive instrument panels and dashboards. In the present application, however, such technique is repurposed from an ornamental finish to a data-carrying functionality. A related PCT patent publication WO2021124581, filed by applicants Tanazawa Hakkosha Co., Ltd and Eschmann Textures International GMBH and published in Japanese, is attached as an appendix to U.S. application 63/248,479, together with a machine translation of its text. Japanese patent publication JP2001062842A (also attached as an appendix to application 63/248,479, with machine translation), filed by Asahi Chemical Industries, also teaches resin-based mold inserts that can be shaped to achieve ornamental texturing.

Sometimes it is necessary for the code pattern to be changed. This can arise, for example, if the code pattern indicates metadata about the molded item, and the metadata changes, such as may occur when the pattern conveys a code indicating the type of plastic, or whether the plastic is virgin or recycled, or whether the item is used for food or non-food applications, or whether the plastic contains a particular additive dye or not. In such cases the old resin insert can be removed and a new insert can be formed and shaped in its place, to convey the new code pattern. Removal can be accomplished by various methods, including being mechanically peeled or cut from the base metal mold, or abrasively ground off. Chemical removal can also be employed.

Thus, one method that can be practiced with the present technology includes providing a mold with a first insert, where the first insert defines a first 2D texture pattern encoding a first payload. The mold with the first insert is used to produce first molded items. The mold is then provided with a second insert defining a second 2D texture pattern that encodes a second payload different than the first payload. The mold with the second insert is then used to produce second molded items that have an attribute different than said first molded items. This attribute can be, for instance, a plastic type, such as PET plastic vs. bisphenol-free PET plastic, or virgin plastic vs. recycled plastic, etc. In other arrangements, instead of changing the texture pattern to reflect a difference in a container attribute, the texture pattern can be changed to reflect a difference in a product that will be packaged in the container. For example, a beverage producer may distribute both regular and diet versions of its drinks in bottles of the same general shape but distinguished by their printed labeling. Bottles for both the regular and diet drinks can use the same base mold, but can be produced using different inserts. One insert conveys a payload corresponding to the regular drink; the other insert conveys a payload corresponding to the diet drink. The drinks can then be bottled in containers that are textured with the different insert-defined payloads.

The base metal of the mold may become nicked or scratched during an insert removal process, but this is of no consequence since the metal serves merely as a foundation for the resin layer, and damage to its surface finish does not impair use of the mold with the resin insert.

Alternatively, some or all of the old insert can be machined-away and a new layer of resin formulation can be applied in its place—atop an older layer of resin that is still affixed to the metal base mold. Still further, a new layer of resin formulation can simply be applied on top of the old resin insert, without removing any of the old resin. In either case a new, blank design surface is restored. This surface may be polished or processed to provide a uniform thickness of the design layer. The restored design layer is then shaped to form the new code pattern. In such shaping, removal of material to form indentation and/or protrusion features may extend only down into the newly-applied resin formulation, and/or it may extend down into the previously-applied resin formulation.

In some embodiments it is desirable to provide venting to enable air to escape when the finished mold, with the shaped design layer insert, is used to mold plastic. This can be achieved in various ways.

One way is to form vent holes that extend through the shaped design layer down to the surface of the base metal mold. Such holes can be formed in the cured resin at the same time that the code pattern is being formed in the cured resin, e.g., by machining or laser action. The vent holes are too small to admit the plastic that will later be shaped by the mold, but permit escape of air down to the base metal. The surface of the base metal, in turn, is scored with a web of surface channels too small to admit the resin formulation when in its liquid state, but again permit air transport. The base metal is further drilled with holes (e.g., spaced in a grid with spacing of 1-10 cm) to which these channels link, extending from the resin-adjoining surface to another surface of the base metal that is at atmospheric pressure. When the mold is then used to shape plastic, air travels down the holes through the resin formulation, to the surface of the base metal, and then travels along the channels in the base metal surface to one of the vent holes that communicates with atmospheric pressure.

In another arrangement the base metal mold is drilled-through with vent holes (e.g., in a grid as in the foregoing embodiment). Steel or Teflon pins are inserted through these holes and protrude out the top surface of the base metal, where the resin formation is sprayed. The presence of the protruding pins through the resin forms vent holes through the resin. After the resin has cured sufficiently to assure that the vent holes will not close, the pins are removed, leaving vent holes through the resin (and the base metal mold). The resin design layer is then shaped and the vent holes persist, providing communication from the shaped surface of the design layer to atmospheric pressure, through the base metal mold.

In still another embodiment, the resin layers are constructed to encapsulate one or plural air reservoirs—foamed, porous or fibrous regions into which air can be pushed under plastic molding pressure. One material suitable for such a reservoir is a patch of metal- or rock-wool. Another is felt. Another is foamed PVA, melamine or urethane. A through-hole channel can be preserved from the surface of the resin down to the reservoir during initial application of the resin formulation to the base metal, by a member such as a steel or Teflon pin, which is removed after the resin is no longer at risk of flowing and closing the channel. Intrusion of the liquid resin formulation into the porous reservoir can be minimized by first impregnating the reservoir with another material, such as water, that turns to vapor at the resin curing temperature. Once the through-hole defining members have been removed, and the resin has been cured (driving out the vapor from the reservoir), the design layer can be shaped. The through-holes persist from the shaped resin surface down to the reservoir(s).

In an exemplary embodiment the reservoir is 2 mm or less in thickness and 1 cm in the other two dimensions. In another the reservoir is 1 mm or less in thickness, and 1 cm in width, and has a length of multiple centimeters. The dimensions used will naturally vary in accordance with application requirements.

Several through-hole channels can link different locations on the surface of the design layer to a common reservoir. Such reservoir(s) can be positioned immediately atop the base metal mold (e.g., bonded to the surface, such as by gluing, before any resin formulation has been applied to the base metal). Alternatively, reservoir(s) can be placed between layers of the resin formulation. In some embodiments the base metal mold is machined to provide one or more surface recess(es) into which the air reservoir(s) fits.

In some embodiments (e.g., those involving vacuum molding), a further air channel links each air reservoir to atmospheric pressure, e.g., via a hole formed through the base metal mold. However, in other embodiments the reservoir(s) is not atmospherically-vented. Rather, it serves simply as a chamber into which air entrapped between viscous plastic and the design layer surface can be pushed during plastic molding. In such instance the reservoir becomes pressurized, but such pressurization serves to reduce deformation of the molded plastic that can arise due to entrapped air.

U.S. Pat. No. 8,794,951 to Tanazawa Hallosha Co. details related arrangements for providing air-porous reservoirs in resin-based molds to apply ornamental texturing to molded items. Teachings from this patent can be incorporated in embodiments of the present technology.

In a different embodiment, the resin insert layer is not placed in the base metal mold and then shaped with the code pattern. Instead, the resin insert layer is formed outside the base metal mold, then shaped, and is then inserted by an interchangeable attachment arrangement into the base metal mold.

In one such embodiment the resin insert is fabricated, e.g., by spraying the liquid resin formulation (as described earlier) onto a release layer, which may be a flat (or curved) Teflon sheet. The resin is partially-cured (e.g., at 80° C. for a thermosetting resin, or cured to an intermediate state by UV) and then shaped with indentations and/or protrusions defining the code pattern (e.g., by laser or machine tool or chemical etching, as described above). The shaped sheet is then applied to the exterior of a complementary mold body.

The complementary mold body is a 3D object having an exterior surface shape like the plastic shape which the finished mold will ultimately be used to produce. That is, if the finished mold is regarded as a female surface, the complementary mold body is the corresponding male surface. This body may be formed of wood, or plastic (e.g., formed by 3D printing), or metal. The complementary mold body may have, e.g., a cylinder shape (or half-cylinder), in the case of a mold used to produce a cylindrical bottle. The shaped resin sheet is impressed against the top of this complementary mold body, such as by applied pressure force from above or vacuum force from through the mold body, below, with the shaped surface facing the mold body and the smooth surface exposed (e.g., facing upwards). The resin is cured on this mold (e.g., by 150° C. heat, or UV) and then, once hardened, the resin is lifted from the complementary mold body. The shaped resin now serves as a rigid insert that can be placed into the base metal mold body, this time with the smooth surface of the resin abutting the base metal mold and with the shaped surface exposed. This rigid insert can be held in place within the base metal mold using mechanical clips, fasteners or by an adhesive, as is known in the molding art.

In some embodiments, multiple shaped resin inserts are created and placed within a single base metal mold, so as to form a code pattern region that is larger than any one insert alone.

By such arrangement, the code pattern formed on a molded plastic object can be easily changed. If a container manufacturer changes the plastic of which the containers will be fabricated, or changes another attribute, the old resin insert (indicating the old plastic type or attribute by a first code pattern) can be removed from the base metal mold, and a second, new resin insert (indicating the new plastic type or attribute by a second code pattern) can be installed. If, thereafter, the manufacturer reverts to use of the original plastic, the second resin insert can be removed and the original resin insert can be re-installed.

In some embodiments, a glass cloth reinforcement layer is included in the resin formulation prior to shaping of the insert, e.g., included between layers of the resin formulation sprayed on a planar release layer, to aid structural robustness of the finished insert. This reinforcement helps assure that the resin insert can survive multiple cycles of installation and removal in the base metal mold without damage. (It will be understood that the insert is used in conjunction with a rigid base metal mold, so the resin insert—which may be on the order of a millimeter or few in thickness—does not need to be strong enough, by itself, to withstand forces arising in later molding of plastic items.)

As before, each depression (prominence) in the resin insert can represent a single mark in a 2D machine-readable code. Alternatively, a grouping of depressions (prominences) can express a single mark. For example, 4 or 40, or 400 depressions (prominences) may be formed within a round or square region on the resin insert having a width of between 20 and 500 microns, to express a single dot of a dot-based code.

U.S. Pat. No. 9,174,365 to Tanazawa Hakkosha Co., Ltd. details related arrangements for forming removable resin inserts that can be interchangeably attached to a mold, to apply ornamental texturing to molded plastic items. Also detailed are air-venting arrangements for use with such resin inserts. Teachings from this patent can be incorporated in embodiments of the present technology.

In still another embodiment, a code pattern is not formed by creating thicker or thinner areas in a generally planar resin layer included within a base metal mold, to thereby define mold protrusions or indentations. Rather, particles, granules or droplets of material (e.g., a resin formulation) are selectively applied in a patterned arrangement to the base metal mold, while leaving other parts of the base metal exposed.

As in the arrangements earlier described, the resin formulation can comprise a thermosetting resin with ceramic and/or fiber aggregate. In one particular embodiment, the formulation includes 50 to 80 parts by weight of resin, with 30 to 80 parts by weight of ceramic granules, and 5 to 10 parts by weight of an inorganic fiber. This yields a somewhat dry, lumpy formulation, which results in granules with uneven surfaces having recesses and projections, which is advantageous in certain applications. In a second particular embodiment, the proportion of resin is increased, up to a factor of about two or three compared to the first particular embodiment. This "wettens" the formulation, enabling surface tension to bring the surfaces of the applied granules into a smoother conformation, which is advantageous in other applications.

These granules can be applied by spray application of the resin formulation through a mask, or CNC deposition by a needle stylus, onto the base metal mold. Solvent (e.g., Cellosolve) can be added to reduce viscosity for application of the resin formulation. Much of the solvent vaporizes in spraying action; any remaining solvent soon vaporizes from the mold surface—particularly with heating.

The granules may have diameters in the range of 1 to 500 microns, with heights between 5 and 200 microns. Many embodiments have granule diameters in the range of 20 to 200 microns, and heights of between 5 and 50 microns. The heights of the granules depend, in part, on the viscosity of the resin formulation, with drier formulations (i.e., including lower fractions of resin) typically having higher heights, and wetter formulations (i.e., including larger fractions of resin) typically having lower heights.

In some embodiments the heights of the granules are controlled to achieve a desired dimensional relationship with the surface roughness of the base metal mold. For example, the heights of the granules may be 10, 20, or 50 times the surface roughness of the mold. If the surface roughness is 2 microns, then the heights of the granules may be 20-100 microns.

If the code that is to be formed by the mold has the form of sparse dots, then a single granule can express a single dot. Alternatively, a grouping of granules can express a single dot. For example, 4 or 40, or 400 granules may be deposited in a round or square region on the base metal mold having a width of between 20 and 500 microns, to express a single dot of a dot-based code.

After the granules of resin formulation have been applied to the base metal mold in the desired pattern, the resin is cured, e.g., by heat in the case of thermosetting resin, or ultraviolet radiation in the case of UV-curing resin, as in the examples detailed above.

The area of the base metal mold that is covered by the granules depends on the form of code, but in many embodiments the area covered is less than 40% of the mold surface area marked with the code, and is more commonly 15%, 5%, 2% or less of such area.

U.S. patent document 9,434,094 to Tanazawa Hakkosha Co., Ltd., details related arrangements, but in the context of controlling gloss of a molded part. Teachings from this patent can be incorporated in embodiments of the present technology.

It will be understood that the detailed arrangements are suitable for all manner of plastic molding, including for vacuum molding, positive pressure (compression) molding, injection molding, extrusion molding and blow molding.

It will be recognized that the detailed arrangements are exemplary. For example, instead of employing a thermosetting resin, embodiments of the present technology can instead use UV-curable resins. Similarly, while the aggregate is described as comprising ceramic particles and inorganic fibers, other aggregate can be used—including metal powders, glass, cement, organic fibers (e.g., a polyamide fiber such as aramid fiber or Kevlar fiber).

3D printing (additive manufacturing) was referenced above. To illustrate, droplets of resin formulation can be applied to the mold, or to another layer of material, to change the surface configuration. In a particular embodiment, resin droplets are applied to a flexible resin substrate (which may be reinforced, e.g., by glass fiber cloth, as detailed above) to form a pattern of protruding bumps. Or the pattern can be 3D printed on a flexible adhesive substrate. Alternatively, the pattern can be mechanically-impressed (molded) into a substrate by a textured pressure roller, e.g., as disclosed in applicant's U.S. Pat. No. 6,608,919 (which concerns texturing of paper). Such mechanical molding can be applied to the substrate before it is cured, or fully-cured. A heat-, UV- or chemical-curing step can then be applied to render the texture pattern longer-lasting.

(Flexible resin substrates are those in which the cured state is non-rigid. Some flexible resin substrates are characterized by a dibasic aliphatic acid, e.g., adipic or sebacic acid, that takes the place of some or all of a saturated acid component.)

The thickness of such a substrate is typically determined based on the scale of the patterning that is formed on or in the substrate, subject to having sufficient structural integrity to facilitate installation in the mold and subsequent removal.

In an illustrative embodiment, a flexible substrate bearing a coded-machine readable pattern is inserted into a base metal mold and adhered in place by the adhesive. If the code pattern needs to be changed, the substrate is removed and is replaced with a new substrate coded with the new pattern.

Japanese patent publication JP2002219715A to Tanazawa Hakkosha KK details a patterned mold insert having the form of a flexible sheet substrate that is attached by adhesive to a metal mold surface. The sheet has a thickness of less than a millimeter, and typically less than 0.5 millimeters (e.g., 100 microns). In the arrangement described in this publication, the sheet is patterned by cuts, e.g., to form text characters. The cuts can be made chemically, employing an exposed photoresist layer. In accordance with the present technology, a sheet is patterned to define a machine-readable code pattern, either by cuts or by raised droplets deposited by 3D printing, as noted above. (A copy of this publication, with machine translation, is attached as an appendix to U.S. application 63/261,837.) Teachings from this publication can be incorporated in embodiments of the present technology.

In other embodiments, the techniques described above are employed to fashion molds with machine-readable line pattern codes. Examples include Delaunay and Voronoi patterns, in which the lines form polygons, as taught in U.S. patent publication 20190378235. Other examples include UPC codes and other 1D bar codes. In still other embodiments, the techniques described above are employed to fashion mold with other signal rich art patterns, e.g., as taught in U.S. patent publications 20200311505 and 20220138892. All such patterns convey plural-symbol (bit) payloads.

It will be understood that metal molds for, e.g., bottles, comprise two parts, each defining half of the bottle geometry. The halves are forced into junction during plastic molding, and then are separated to release the molded bottle. Code-bearing inserts, whether rigid or flexible (or deposited/cured directly on the base metal mold), can be positioned in both halves of such a mold, to define a pattern that spans most or all of the bottle's circumference. The metal mold thus defines the general, gross shape of the bottle, while the insert(s) define the machine-readable code. If the inserts are viewed in the coordinate system of the bottle, the length of the insert can be in the circumferential direction, and the width of the insert can be in the direction of the height of the bottle (i.e., parallel to the axis of the bottle). The width of the insert(s) can be as small as a centimeter, or as large as the bottle is tall. The length of the insert(s) can be as small as a centimeter, but more typically forms a swath spanning most or all of the circumferential distance of one or both mold halves.

In an illustrative embodiment, the insert defines a connected binary machine readable code, or a Type 1, Type 2 or Type 3 binary watermark pattern. In a particular embodiment, the machine-readable code that is defined by the insert comprises marks positioned at locations within a regular array of locations, with the marks having dimensions between 20 and 350 microns, and a majority of the locations (e.g., 50%, 85%, 95% or 98% or more) being unmarked. The arrayed locations are typically square, and the marks have widths that may be equal to the widths of the locations, or smaller or larger than such widths. The marks can express a plural-bit message, and also express a reference signal to aid in identifying the regular array of locations.

Adhesion of the resin formulation to the base metal mold prior to resin curing can be aided by surface treatment of the mold, e.g., by ice- or glass bead-blasting to increase the surface roughness.

The forces that the cured resin formulation will need to withstand naturally depend on the particular application. In one particular embodiment, the resin and aggregates are chosen, and used in a suitable fraction, to achieve a tensile strength of between 30 and 120 megapascals, and a compressive strength of between 140 and 180 megapascals. Of course, the strength of the material can be tailored to the requirements of the application.

Molding of Plastics Such as High Density Polyethylene (HDPE)

HDPE is one of several plastic resins that tends to stick to smooth mold surfaces. If not addressed, this sticking can cause the still-a-bit-warm plastic to pull up into spike artifacts when the item is forced from the mold, ruining the desired plastic surface finish.

An analogy is applying wet paint between two sheets of metal or glass and pressing the sheets together. If the top sheet is pulled from the bottom sheet, the surface tension resists the separation. If enough force is applied to pull the sheets apart, the paint surface on the metal is no longer smooth.

To address problem of plastic sticking to molds, operators sometimes sandblast the molds (typically aluminum) used with HDPE, to give a subtle surface texture (e.g., as is commonly seen on milk jugs). This sandblasted surface has a surface roughness (Ra) value on the order of about 2 microns. But this sandblasted finish wears off thru repeated use—and must be repeated every year or two.

Applicant's work detailed in the earlier-cited documents teaches creation of watermark signals having the form of a sparse pattern of holes in an aluminum mold. The holes function akin to sandblasting, making it easier to remove the plastic item from the mold. And the holes are long-lived—unlike sandblasted texture.

Testing was conducted to determine how such molds work with HDPE, using different hole depths and widths. (E.g., holes may be 160 microns across for a 150 waxel per inch mark, and 50 microns deep.) As the holes got larger, it was easier for plastic to enter. If the plastic entered far-enough to reach the end of a hole, it tended to adhere. This caused spike artifacts as noted above, with the sticky (like taffy) plastic sticking and pulling as the item is removed from the mold. (Similar problems arose with depth. The deeper it is, the more compressible air is inside, and the deeper the hot plastic can intrude and come into contact with the sidewalls—to which it may also stick.)

Thus applicant found that sticking is minimized by use of smaller, shallower holes. And it is better to have isolated holes (e.g., characteristic of sparse marks due to their "keep-out" regions) rather than depressions of elongated or extended form (e.g., as in connected binary marks as detailed in U.S. patent publication 20210387399), because the bigger the opening, the more likely plastic will get in and stick to an interior surface.

Returning to the metal/glass sheets and paint example, applicant found that the holes help relieve the surface tension as the item is removed from the mold; a bit of air trapped in the hole relieves the vacuum in the nearby area that pulling the plastic from the mold surface otherwise causes, allowing the warm item to be more easily removed from the mold.

And the relief of this vacuum caused by the air trapped in the holes introduces another phenomenon: as the plastic is pulled from the mold surface, ridges form in the plastic surface, at locations roughly mid-way between the holes. So the pattern of holes causes a corresponding pattern of ridges to form, with the ridges forming closed or mostly-closed shapes around certain of the holes. (Mostly-closed means that an imaginary line on the surface of the item, crossing the hole, intersects the ridge at two locations—once on each side of the hole.) Something like a Voronoi pattern (e.g., FIG. 3A in U.S. patent publication 20190306385) appears—but without the mathematical precision. It has somewhat the appearance of a honeycomb pattern.

In testing, it appears that these ridges contribute to the watermark reading, strengthening representation of the watermark signal.

Thus, in accordance with a further aspect of the technology, a plastic item is characterized by ridges that form closed or mostly-closed shapes around certain locations, where such ridges aid in representing a machine-readable indicia.

In one particular process the holes are formed by machine tools, such as a drill bit or other CNC tool. In another embodiment a laser is used to form the holes. (The laser can also be used to texture the smooth surface between the holes.) In still other embodiments spark erosion (electrical discharge machining) is used to form the holes.

Unexpected Results (Mold Indentations Yield Plastic Indentations)

In a further aspect of the technology, a recess feature (i.e., a dimple, depression, cavity, indentation or debossed dot) is formed in the surface of a plastic item by a novel arrangement.

Figure 26:
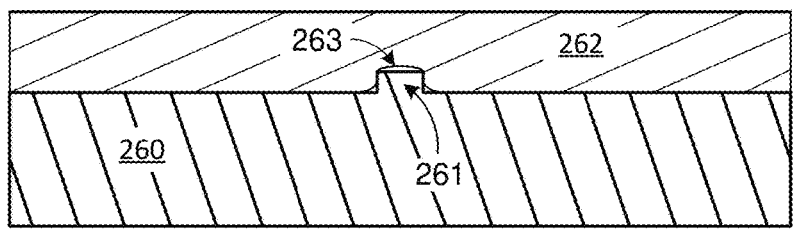
FIG. 26 shows a mold with a protrusion that forms a corresponding indentation in plastic.

Normally, a recess feature is formed in plastic by use of a mold that has a complementary protrusion, or spike, feature. The spike presses into the warm plastic and forms a recess. Such arrangement is shown in FIG. 26, where an aluminum mold 260 includes a spike feature 261. When warm plastic 262 is urged against the mold, a corresponding recess 263 is formed in the surface of the plastic.

Figure 27:
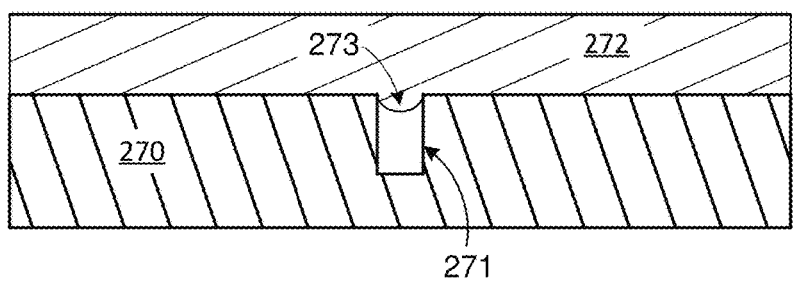
FIG. 27 shows a mold with an indentation (cavity) that forms a corresponding protrusion (bump) in plastic.

The opposite arrangement is also used to form a protrusion or bump (embossed dot) in the surface of plastic. That is, the mold has a complementary recess or cavity feature. The warm plastic is urged under pressure against the mold and spreads into the cavity, forming a protrusion. Such arrangement is shown in FIG. 27, where an aluminum mold 270 defines a cavity 271. The warm plastic 272 is urged against the mold and extends into the cavity 271, forming a corresponding plastic bump 273.

Applicant has discovered that, surprisingly, an indentation can be formed in molded plastic by use of a mold that, itself, has an indentation feature.

Figure 28:
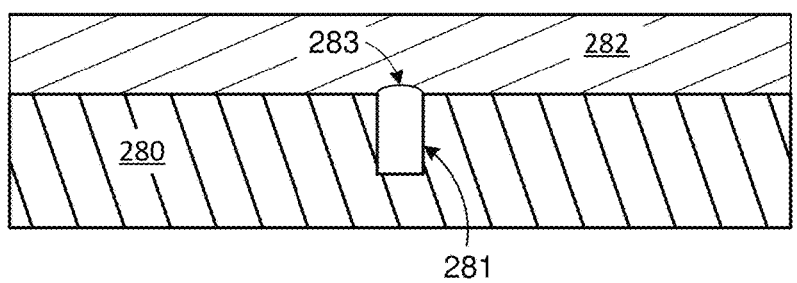
FIG. 28 shows that a mold with a cavity can sometimes be employed to form an indentation, rather than a protrusion, in plastic.

This is shown in FIG. 28. As with FIG. 27, an aluminum mold 280 defines a cavity 281. As with FIG. 27, warm plastic 282 is urged against the mold. However, rather than extending into the cavity and forming a bump, the plastic surface forms an indentation 283.

Whether the plastic behaves as in FIG. 27, or FIG. 28, depends on a variety of factors.

One factor is the type of plastic used. The FIG. 28 result has been found to occur with HDPE and LDPE (high- and low-density polyethylene), but has not been seen with PET or PP (polypropylene). PET and PP seem to only yield the results shown in FIG. 27. Other plastic types have not yet been investigated.

Another factor is the type of molding process. The FIG. 28 result has been found to occur with extrusion blow-molding of bottles, but not with injection stretch blow-molding.

Extrusion blow-molding of a bottle involves (a) extruding a tube of warm plastic, (b) clamping the bottom to seal, and (c) filling the tube with pressurized air to expand the tube against the surrounding mold. Injection stretch blow-molding of a bottle involves (a) injection-molding a thumb-sized hollow preform, and (b) filling the preform with pressurized air to expand the preform against the surrounding mold. Extrusion blow-molding typically involves lower pressures than injection stretch blow-molding, e.g., 1.5-10 bars vs. 25-40 bars.

Another factor is the size of the mold cavity. In an illustrative process environment, with cylindrical cavities, the FIG. 27 result tends to occur when the cavity diameter is 200 microns and larger. At diameters of 160 microns and smaller, the FIG. 28 result routinely occurs.

Another factor is the surface roughness of the mold surface around the cavity. Applicant has found that if the surface is roughened, as by sandblasting, then it is unusual for the FIG. 28 result to be achieved. Conversely, the more smooth (polished) the surrounding mold surface is, the more likely it is that the FIG. 28 result is achieved. For molds with cavities having diameters of 160 or 180 microns, the threshold between the two results commonly occurs with a surface roughness of between 0.8 and 1.6 microns. For example, with a surface roughness of 0.5 microns, the result of FIG. 28 tends to occur. With a surface roughness of 2 microns, the result of FIG. 27 tends to occur.

(Roughening the mold surface aids in release of the molded item. But a lesser roughening than is produced by sandblasting can be used. For example, ice-blasting can be used, such as with dry ice, to yield a surface that is roughened, but with a surface roughness below 1.6 or 0.8 microns.)

Although research is ongoing, it is hypothesized that the unexpected effect, in which a mold indentation serves to create a plastic indentation, arises as follows: A pocket of air is trapped around the mold cavity 281 by introduction of plastic to the mold. This air is pressurized by thermal expansion and by the molding pressure, which causes the pocket of trapped air to become compressed as it is squeezed into the cavity volume. At molding pressures used with injection stretch blow molding, e.g., above 10 PSI, the molding pressure drives part of the viscous plastic into the cavity 281, overcoming the force of the trapped air and the shear stress posed by the cavity geometry on the moving plastic. But at lower pressures, the viscous plastic's resistance to shearing forces at the cavity entrance, in conjunction with the resistance force posed by the trapped air, prevents the plastic from extruding into the cavity, and in fact leads to the opposite effect—formation of an indentation in the plastic surface.

This rationale helps explain some of the observed behaviors, such as the diminution of the indentation effect with increased mold surface roughness. The roughening of the mold surface around the entrance to the cavity permits some of the air in the trapped air pocket to escape into the network of tiny passages defined by the rough surface—limiting the air pressure build-up in the cavity that is needed to form an indentation in the viscous plastic.

Tests were conducted using molds having cavities of different diameters (120, 140, 160, 180, 200 and 240 microns), while extrusion blow-molding white HDPE bottles. Several process parameters were also individually-varied. (Each test bottle had a fluid capacity of 100 ml and a height of four inches.) The nominal process parameters were:

Blowing pressure=5 bars
Cooling temperature=10° C.
Item weight=5.3 grams
Cooling time=3.5 seconds
Extrusion head temperature=190° C.

Under these nominal parameters, the unexpected indentations appeared reliably, and produced robust watermark signal strengths (collectively "good results"), whether the mold hole (cavity) diameters were 180 microns or 120 microns, or in between. (Robust watermark decoding was judged based on a message strength score, per the earlier-noted references.) Extrapolating from the test results, and considering the rationale detailed above, it appears these good results are achieved at still smaller cavity diameters, e.g., 100 microns and below.

Each of the above-noted process parameters was varied from its nominal value, as follows: blowing pressure was varied from 5 to 3, 4 and 6 bars; cooling temperature was varied from 10° to 15° and 20° C.; item weight was varied from 5.3 grams to 7, 8, 9 and 10 grams; cooling time was varied from 3.5 seconds to 2 and 5 seconds; and extrusion head temperature was varied from 190° C. to 180, 205 and 220° C.

For cavities having diameters of 160 microns and smaller, good results were reliably achieved with each one of these process variations. At 180 microns, 200 microns and above, good results were sometimes achieved, but were progressively more sensitive to variations in certain of the noted parameters.

For example, at a blowing pressure of 6 bars, the watermark signal strength scores resulting from differing cavity diameters were as follows:

| 120 microns | 140 microns | 160 microns | 180 microns | 200 microns | 240 microns |
| --- | --- | --- | --- | --- | --- |
| 489 | 413 | 420 | 33 | 138 | 179 |

It can be seen that at a blowing pressure of 6 bars, good results required smaller holes, i.e., of 160 microns and smaller. Consistent with the earlier-stated hypothesis, higher pressures are more likely to drive plastic down into the cavities, against the resistances posed by shear stress and trapped air pressure, and produce protruding bumps rather than indentations in the molded plastic surface.

Note the sharp drop-off in watermark strength scores at a cavity diameter of 180 microns, and the higher watermark strengths at still larger cavity diameters. The higher watermark scores found with still larger cavity diameters may be due to the mold cavities forming bumps rather than indentations (i.e., the molding results that are traditionally expected), and the increasing prominence of such bumps with increasing cavity size.

(The watermark strength score values shown above are arbitrary and depend on the particular scoring system applied, but the relative results for different cavity diameters are illustrative.)

Watermark signal strength variations were likewise seen with certain of the other listed process variations.

The lesson seems to be that, with cavity diameters of 160 microns and smaller, the indentation effect appears reliably over a wide range of process variations. But with larger cavity diameters, progressively more care needs to be taken to determine that good results are, in fact, achieved with the particular set of process parameters expected to be used. And progressively more care also needs to be taken to assure that the process parameters are kept near these set values, despite foreseeable changes in ambient temperatures and other variables.

(Fortunately, since watermark signaling is typically highly-redundant, even diminished watermark signal strength scores can still provide satisfactory decoding.)

Experiments were also conducted varying the spatial density of cavities in the mold surface.

In a particular embodiment, the pattern of marks (e.g., cavities) formed in a mold is a quantized approximation of a continuously-tone digital watermark signal. This approximation can be made more or less accurate by changing the spatial frequency at which the continuous-tone watermark pattern is sampled. By sampling at a higher spatial frequency, the density and number of marks (i.e., the spatial density of cavities across an area of mold surface, and the number of cavities)—is increased.

As reviewed above, and detailed in our U.S. patent publication 20210299706, we term this density parameter as "dot density," or "DD." At DD20, 20% of the sampled locations in the pattern are candidates to express a binary quantization of the continuous-tone watermark signal. About half of these locations have one binary state and are marked, and the other half have the other binary state and are left unmarked. So with DD20, about 10% of the sampled locations are marked. With DD30, about 15% of the locations are is marked. With increased DD value, the spacing between cavities is necessarily reduced.

Tests were conducted to determine whether the unexpected creation of plastic indentations from mold indentations is dependent on DD value. Tests were conducted at DD20 and DD30. These tests indicated that the unexpected results are not critically dependent on a particular mark density. However, it appears that for smaller hole sizes (e.g., 120 microns), DD30 yields somewhat stronger watermark signal strengths, whereas for larger hole sizes (e.g., 200 microns), DD20 yields somewhat stronger strengths. However, all strengths were more than adequate to assure reliable decoding. Extrapolating from the test results, it appears a wide range of mark densities can be used satisfactorily, e.g., selected from the range DD10 to DD40. Generalizing, the larger the hole size, the less-dense can be the marks in the pattern.

While the foregoing discussion references holes by their diameters, the operative mechanism may be due more to the cross-sectional areas of the indentations. Thus, square openings with comparable areas may be used instead of round openings (cylindrical cavities), etc.

Tests were also conducted on natural-colored HDPE (a somewhat milky transparent resin), instead of white, with no significant differences.

The mold-indentation-yields-plastic-indentation phenomenon has been studied across different cavity diameters, but not across different cavity depths. But depth is believed to be relatively less critical, unless the depth is less than about 20% of the cavity diameter (e.g., a depth of 20 microns, for a hole that is 160 microns in diameter). A rule of thumb may be to form cavities that are 0.5-2.0 times as deep as they are wide. (It will be understood that cavity venting should not be employed in such arrangements, as it would prevent the pressurization of trapped air needed to achieve the noted mold-indentation-yields-plastic indentation phenomenon.)

Figure 29:
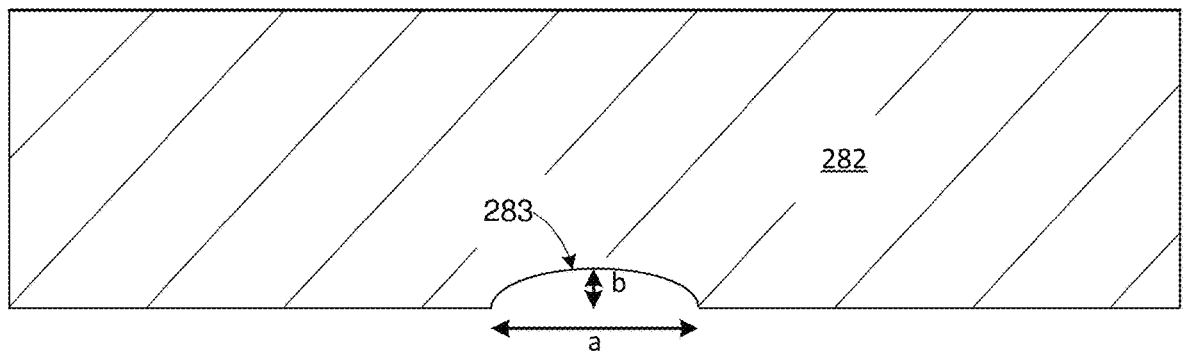
FIG. 29 shows a not-to-scale enlargement of plastic formed with an indentation, using a mold with a cavity.

FIG. 29 shows a not-to-scale enlargement from FIG. 28. The width "a" of the indentation formed in the plastic is on the order of the diameter of the indentation in the mold, but often does not match it exactly. For a mold indentation that is 150 microns diameter, the width "a" may range, e.g., between 100 and 300 microns, and is commonly between 150 and 250 microns. The depth "b" of the recess in the plastic is typically smaller, by a factor of three or more, than its width "a." Again, for a mold indentation of diameter 150 microns, the depth "b" of the indentation in the molded plastic may be 50, 20, 10 or 5 microns, or smaller. As the applied pressure increases beyond about 5 bar in the earlier example, the depth "b" decreases.

In a prophetic example embodiment, HDPE is extrusion blow-molded using a mold shaped to define cylindrical cavities that are 150 microns in diameter, 150 microns deep, and having a surface roughness around the cavities of 0.5 microns. A pressure of 6 bars is applied. The result is a shaped plastic item having surface recesses (rather than bumps) at locations corresponding to the mold cavities.

In another prophetic example embodiment, LDPE is extrusion blow-molded using a mold shaped to define having cavities that are 85 microns in diameter, and having a surface roughness around the cavities of 0.8 microns. A pressure of 5 bars is applied. The result is again a shaped plastic item having surface recesses (rather than bumps) at locations corresponding to the mold cavities.

The described arrangements are superior in certain respects than the conventional molding arrangement of FIG. 26, for making fine indentations in the surface of a plastic item. This is because the spike 261 of FIG. 26 is prone to wear, especially if it is 200 microns or less in diameter, and thus degrades rapidly with use. The cavity 281 of FIG. 28, in contrast, does not degrade so rapidly.

Although described in the context of codes comprising isolated cavities (indentations) which all have the same shape, the unexpected results detailed above are also manifested with codes comprised otherwise, e.g., by connected binary marks and by the dilation-erosions arrangements such as are illustrated in FIGS. 25A-25D. In these cases, it can be desirable that most of the aggregate area of the mold indentations (e.g., 51%, 75% or 90%) comprise features that are individually too small to contain a circle of a threshold dimension, such as 160 or 200 microns.

Figure 30A:
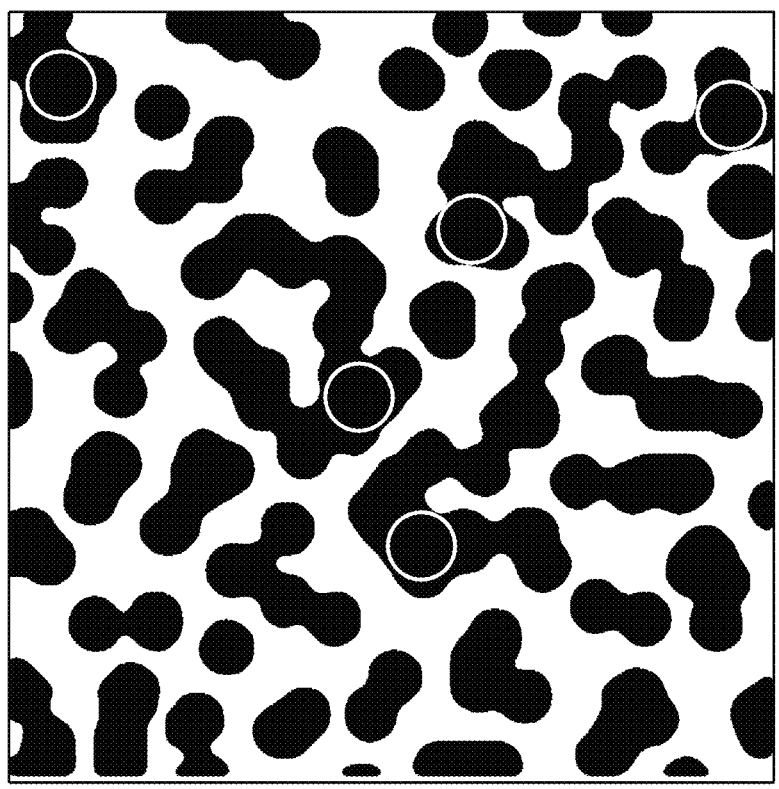
FIGS. 30A and 30B show excerpts from a pattern of connected binary mold features (cavities).

FIG. 30A illustrates, showing an excerpt of a connected binary mark comprising features of various shapes and sizes. The features, shown in black, collectively comprise 48% of the illustrated area. (The mold is etched, milled, or otherwise shaped to form indented cavities corresponding to these black features.)

Figure 30B:
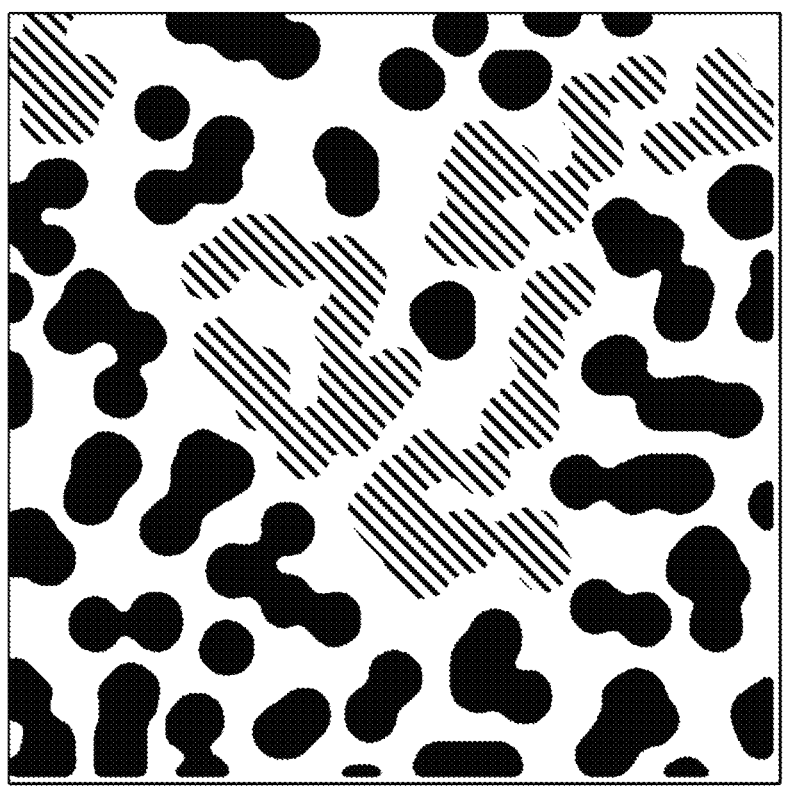

Five of these features are individually large enough to contain a circle (shown in white) that is 180 microns in diameter. These five features are prone to admitting viscous plastic, yielding a corresponding protrusion in a molded plastic surface rather than an indentation. These large features, shown in crosshatch in FIG. 30B, comprise 35% of the aggregate feature area and 18% of the total illustrated area. Thus, 65% of the aggregate feature area comprises features that are relatively small—too small to contain a 180 micron circle (i.e., those features shown in black in FIG. 30B). Thus, 65% of the aggregate feature area is of a character suitable to produce indentations.

It will be appreciated that, depending on the scale of individual features, a mold pattern like that of FIG. 30A may produce both indentations and protrusions in the shaped plastic. The watermark signal expressed by such a hybrid-texture plastic usually reads well. The caveat is that individual certain features may be within a transitional size range that is between indentation-forming and protrusion-forming (depending on process parameters), and thus result in little, if any, plastic deformation. Such features don't contribute much, if any, signal. If features of this type dominate the pattern (e.g., comprising 75% or more of the aggregate feature area), then watermark robustness may be comprised.

(The diameter of the largest circle that can fit within a feature is regarded as the "opening dimension" of the feature. This provides a metric by which sizes of irregular feature shapes (cavities) can be quantified, such as those depicted in FIG. 30A. For cylindrical features, the opening dimension is the diameter of the cavity.)

Just as connected binary patterns can exhibit the indentations-in-mold-yield-indentations-in-plastic behavior, so can stippled art patterns, of the sort detailed in U.S. patent publication 20190378235. Similarly for line art patterns, such as the Voronoi and Delaunay patterns detailed in the just-cited publication, and the line patterns detailed in publication 20210390358.

Exemplary extrusion blow molding systems in which the above-detailed arrangements can be employed are detailed in U.S. Pat. No. 4,824,618, 20010009242, 20020130445, 20080128959, 20110062610 and 20140034658.

CONCLUDING REMARKS

Having described and illustrated the principles of applicant's inventive work with reference to illustrative features and examples, it will be recognized that the technology is not so limited.

For example, while the specification describes various techniques independently, applicant intends that they be used in combination. For example, the connected binary mark can be used in any of the embodiments disclosed in other sections of the specification.

Similarly, while marks are commonly placed at locations corresponding to minima in a continuous-tone watermark signal (i.e., the smallest, or most negative values—indicating the darkest locations), the opposite approach can be employed. Marks can instead be placed in a binary watermark pattern at locations where the corresponding continuous-tone watermark is light instead of dark. (Imaging of plastics often yields an inversion, in which the marks appear light against a darker background of surrounding unmarked, smooth plastic surface. Thus, many watermark detectors look for signals expressed in both forms: normal and inverted.)

The references to a watermark pattern comprising a square 128×128 array of locations is for purposes of illustration only. A watermark pattern can comprise a larger or smaller array of locations, and need not be square in shape.

Although the described embodiments employ a reference signal comprised of peaks in the spatial frequency (Fourier magnitude) domain, it should be recognized that reference signals can exhibit fixed features in different transform domains by which geometric synchronization can be achieved.

Relatedly, it is not necessary for a digital watermark signal to include a distinct reference signal for geometrical synchronization purposes. Sometimes the payload portion of the watermark signal, itself, has known aspects or structure that enables geometrical synchronization without reliance on a separate reference signal.

The term "watermark" commonly denotes an indicia that escapes human attention, i.e., is steganographic. While steganographic watermarks can be advantageous, they are not essential. Watermarks forming overt, human-conspicuous patterns, can be employed in embodiments of the present technology.

For purposes of this document, a watermark is a 2D code produced through a process that represents a message of N symbols using K output symbols, where the ratio N/K is less than 0.25. (In convolutional coding terms, this is the base rate, where smaller rates indicate greater redundancy and thus greater robustness in conveying information through noisy "channels"). In preferred embodiments the ratio N/K is 0.1 or less. Due to the small base rate, a payload can be decoded from a watermark even if half of more (commonly three-quarters or more) or the code is missing.

As indicated, in one particular embodiment, 47 payload bits are concatenated with 24 CRC bits, and these 71 bits ("N") are convolutionally encoded at a base rate of $\frac{1}{13}$ to yield 924 bits ("K"). A further 100 bits of version data are appended to indicate version information, yielding the 1024 bits referenced earlier (which are then scrambled and spread to yield the 16,384 values in a 128×128 continuous tone watermark).

Some other 2D codes make use of error correction, but not to such a degree. A QR code, for example, encoded with the highest possible error correction level, can recover from only 30% loss of the code.

Preferred watermark embodiments are also characterized by a synchronization (reference) signal component that is expressed where message data is also expressed. For example, every mark in a most watermarks is typically a function of the synchronization signal. Again in contrast, synchronization in QR codes is achieved by alignment patterns placed at three corners and at certain intermediate cells. Message data is expressed at none of these locations.

Patterns that can be impressed in plastic by molds include "signal rich art" patterns, such as are detailed in U.S. patent publications 20190213705, 20190378235 and 20200311505. For example, a binary pattern can be formed as a stipple pattern, a Voronoi pattern, a Delaunay pattern, etc.

While reference was made, e.g., to molding PET plastic having a thickness of 0.2-0.4 mm, it will be understood that such dimensions are illustrative of just a few particular embodiments. In other embodiments the shaped plastic may be up to, e.g., 1.5 mm in thickness. Naturally, other plastics can be used.

Similarly, while an elemental feature width of 0.169 mm was often referenced (which corresponds to watermark elements, or waxels, at 150/inch), it should be understood that waxels of between half and twice this size may also commonly be used (i.e., between 0.085 mm and 0.338 mm, corresponding to 300-75 waxels/inch).

Naturally, while the connected binary form of 2D code is described in the context of a plastic surface texture, it will be understood that such a connected binary code can likewise be implemented otherwise, such as by printing on a substrate, or laser-etched onto a plastic item directly.

In some embodiments of the present technology, the mold is anodized, e.g., to increase its life. Relatedly, in some embodiments, smooth surfaces of the mold are sandblasted or otherwise processed to slightly increase the surface roughness, which can aid with release of the molded plastic part. (Typically, the magnitude of such surface roughness is less than 10% of the variation in surface level caused by the watermark signal.)

Some molded plastic items have different wall thicknesses at different locations. For example, a clamshell food container may have a base that is thicker than its sidewalls. In such case, the PET can be molded to include differently-sized protrusions and/or depressions in accordance with the respective wall thicknesses (i.e., protrusions of greater height, and depressions of lesser depth, in the base in the cited clamshell).

Figure 13:
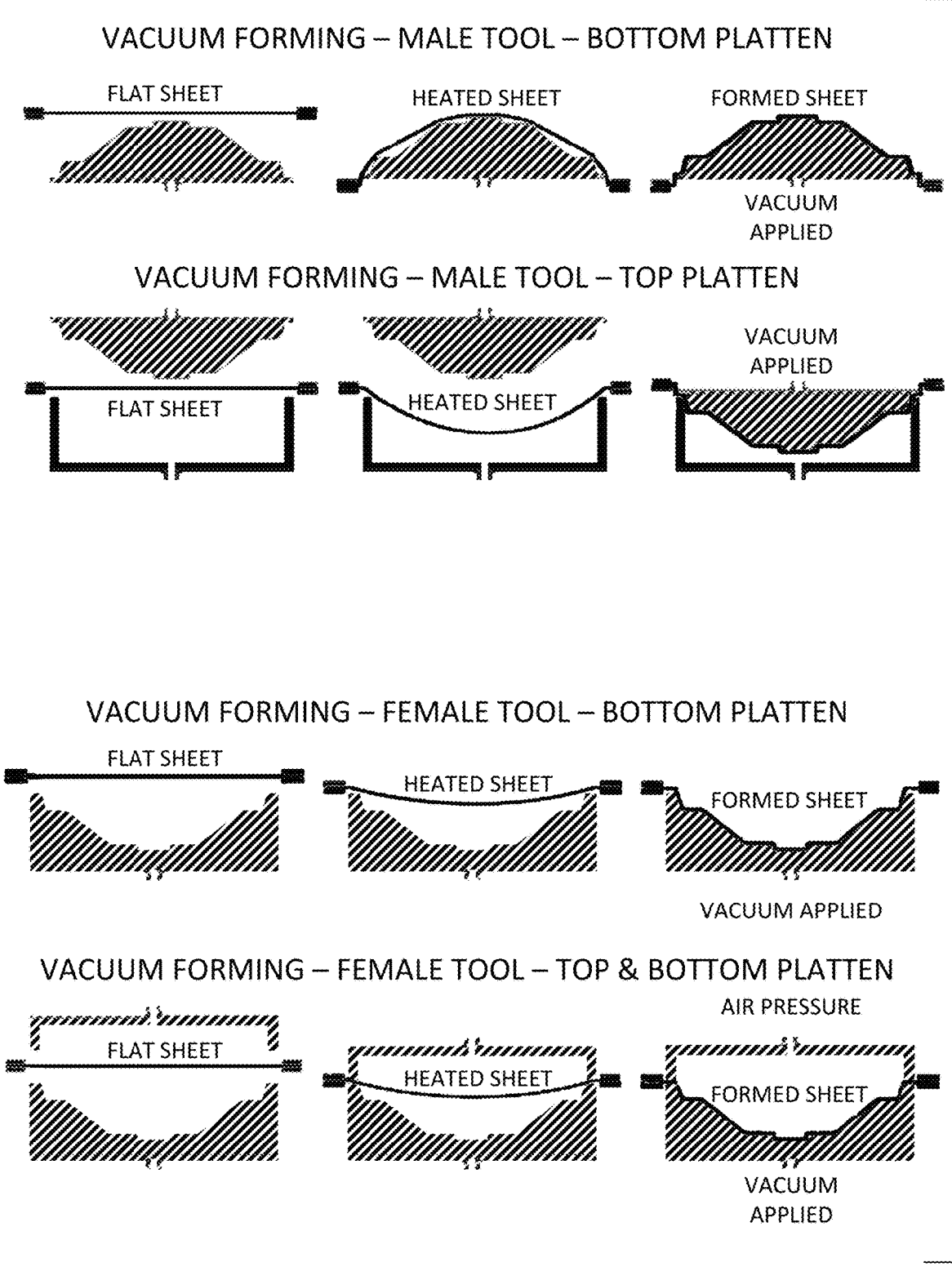
FIG. 13 shows various means by which a shaping force can be applied to a moldable material to urge it against a mold surface.
Figure 14:
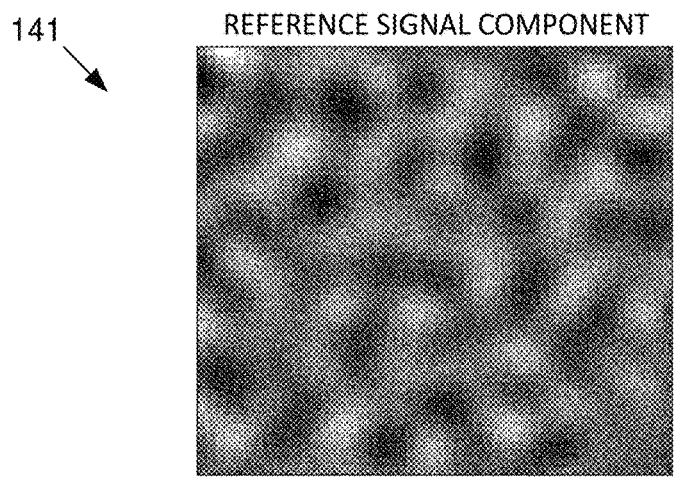
FIG. 14 shows reference and interpolated payload component signal blocks combined in a weighted sum to yield a continuous-tone signal block.
Figure 14:
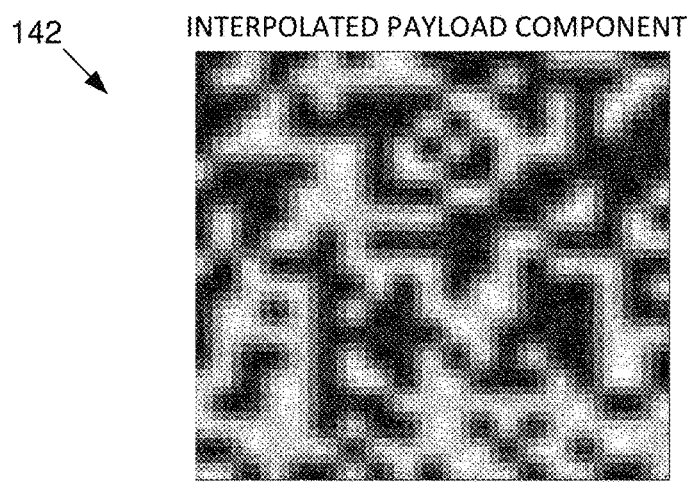
Figure 14:
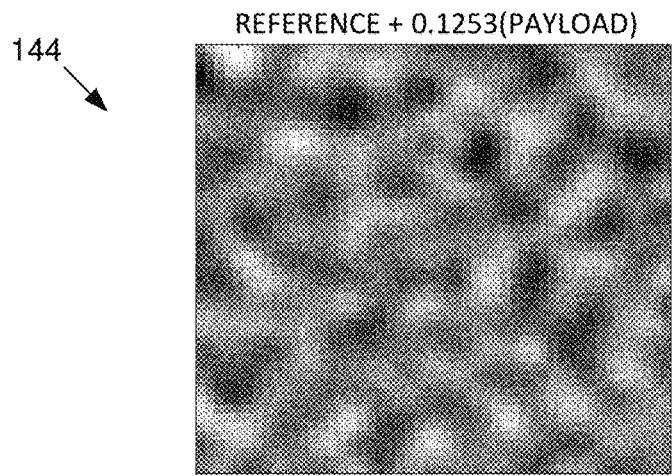
Figure 15:
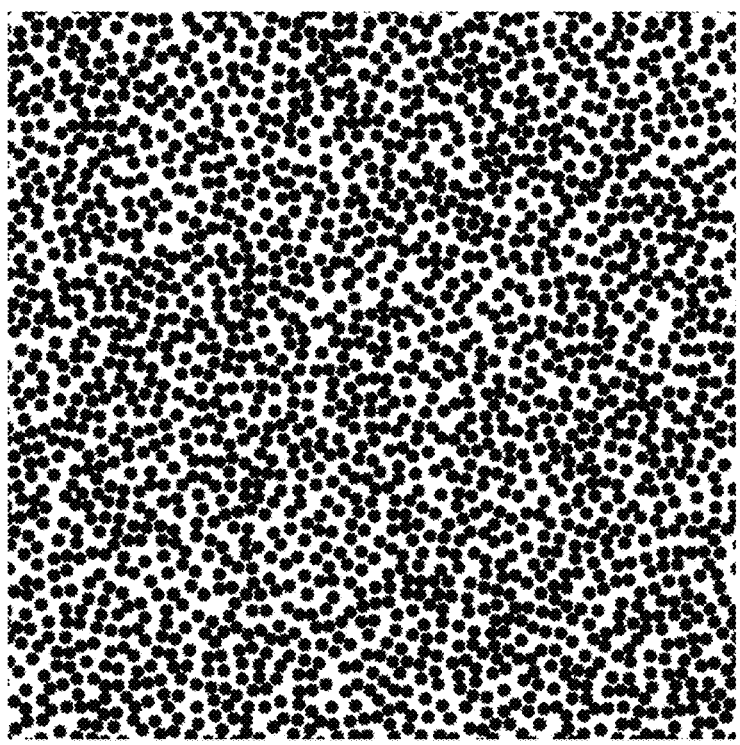
FIG. 15 shows an illustrative binary pattern, with which a mold for a plastic container can be shaped.
Figure 16:
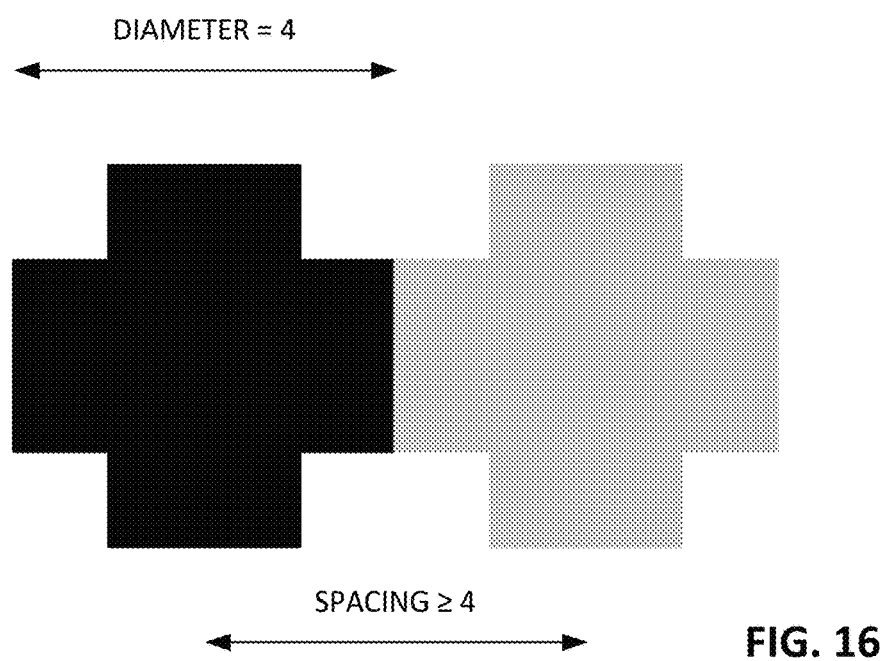
FIG. 16 illustrates two hole patterns, or stamps, adjoining edge-to-edge.
Figure 17:
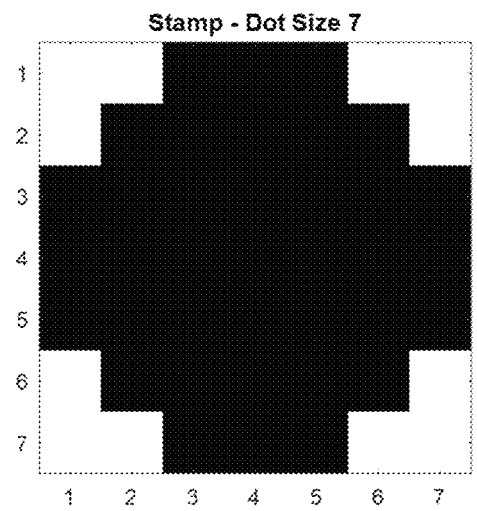
FIG. 17 shows a 7×7 pixel approximation of a circle, which can be used as a stamp pattern.
Figure 19:
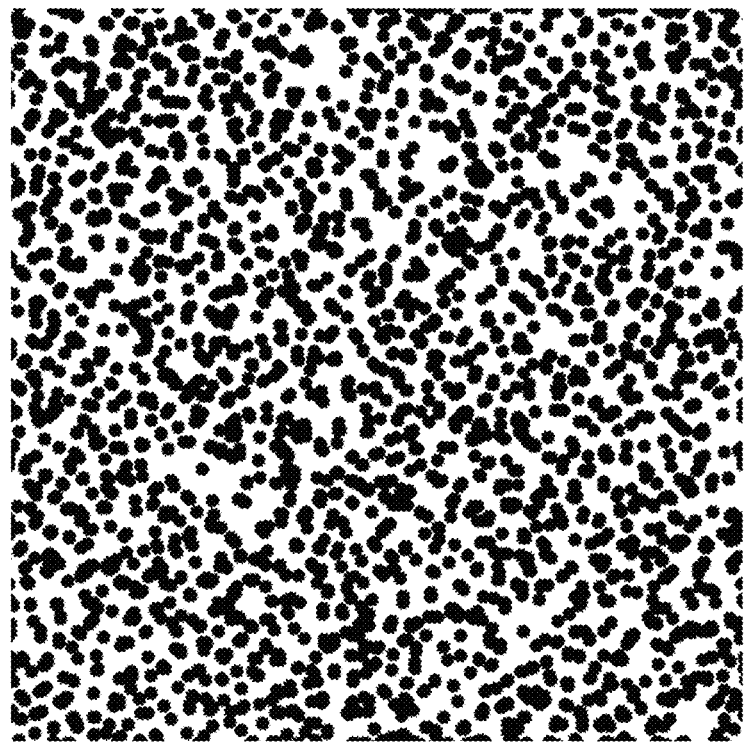
FIG. 19 is a connected binary pattern produced using the algorithm of FIG. 18.
Figure 18:
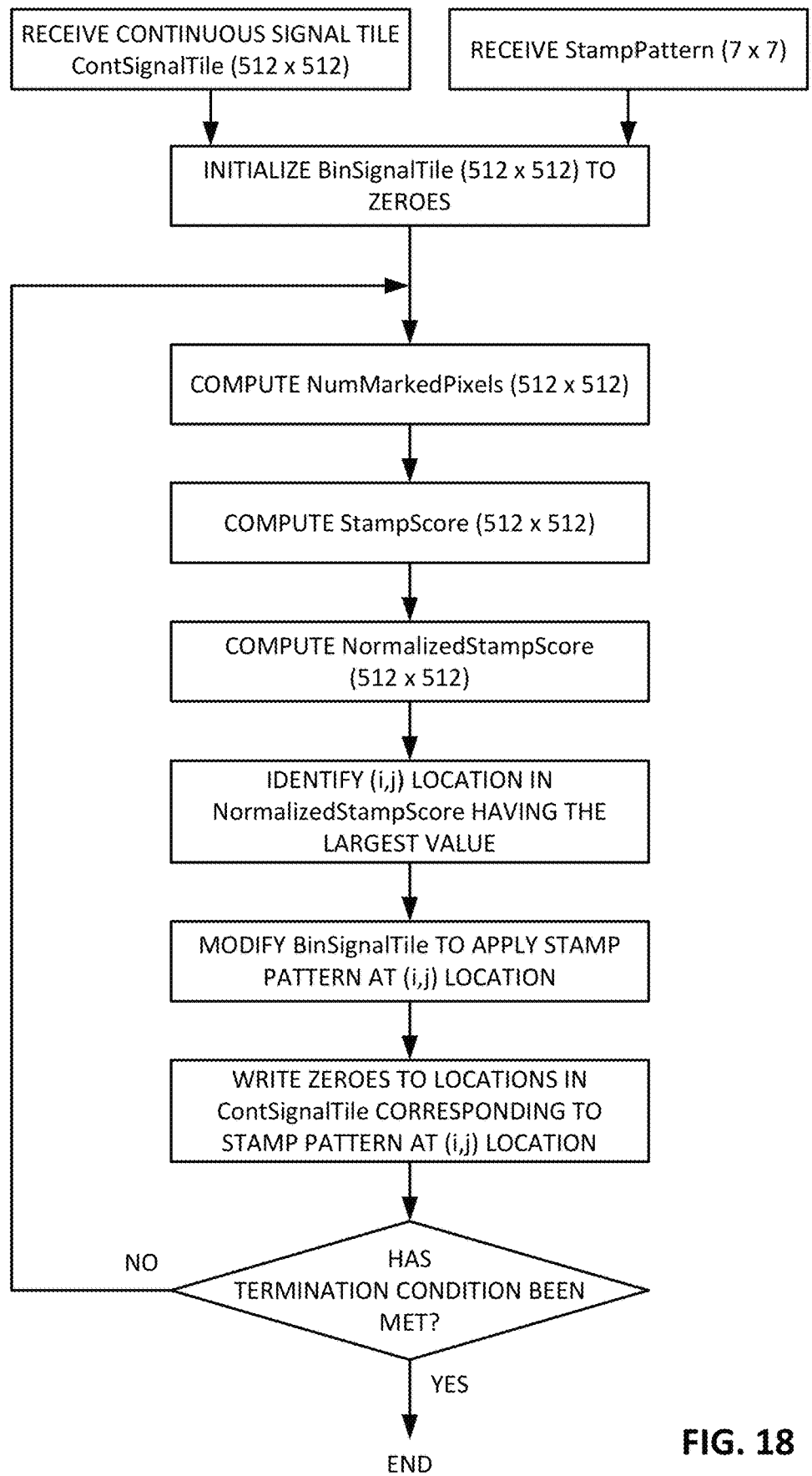
FIGS. 18 and 18A define algorithms for producing a connected binary pattern from a continuous-tone signal block.
Figure 18A:
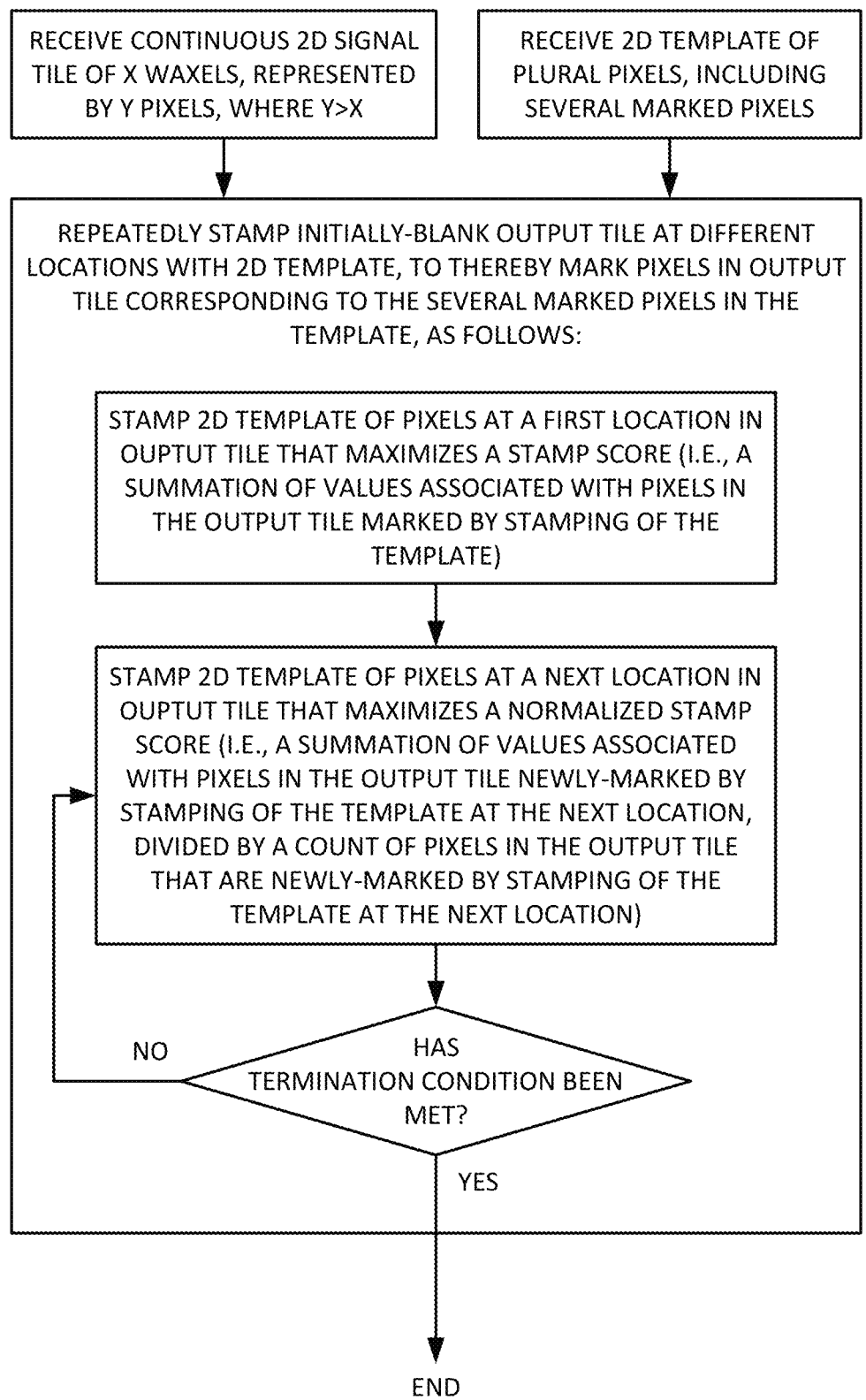
Figure 20:
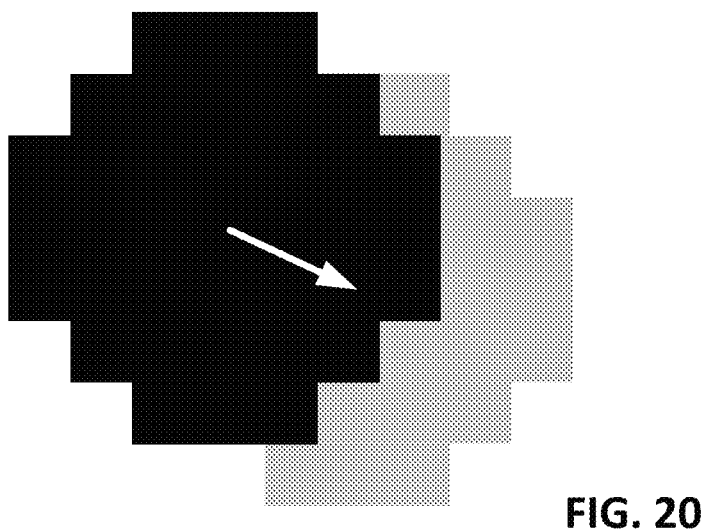
FIG. 20 illustrates how the stamp of FIG. 17 can be applied in two locations in overlapping fashion.
Figure 21A:
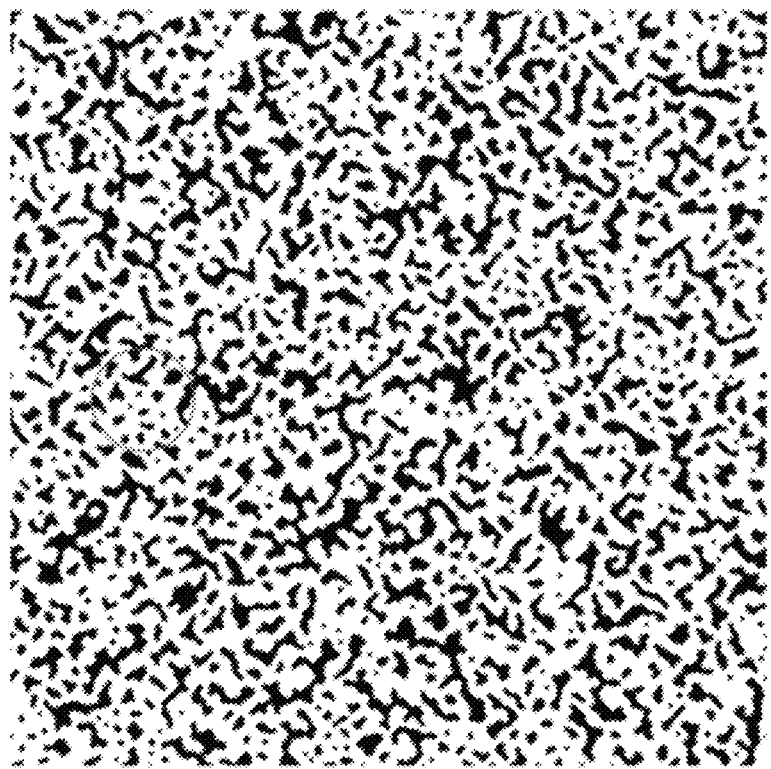
FIG. 21A shows a binary pattern of spikes, produced by a variant of the FIG. 18 algorithm.
Figure 21B:
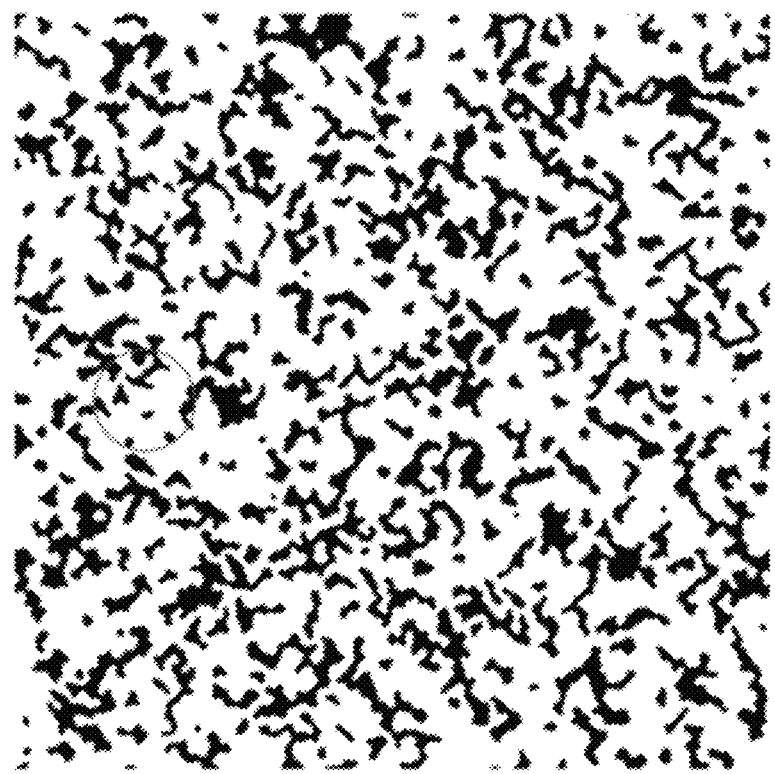
FIG. 21B shows the same pattern as FIG. 21A, but generated using a keep-out constraint of 0.068 inches.
Figure 22A:
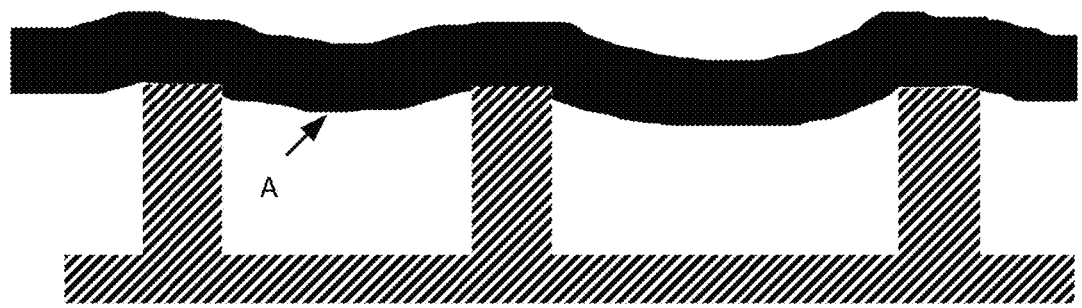
FIGS. 22A and 22B show two physical phenomena that contribute to shaping of plastic resin by a pattern of protruding spikes.
Figure 22B:
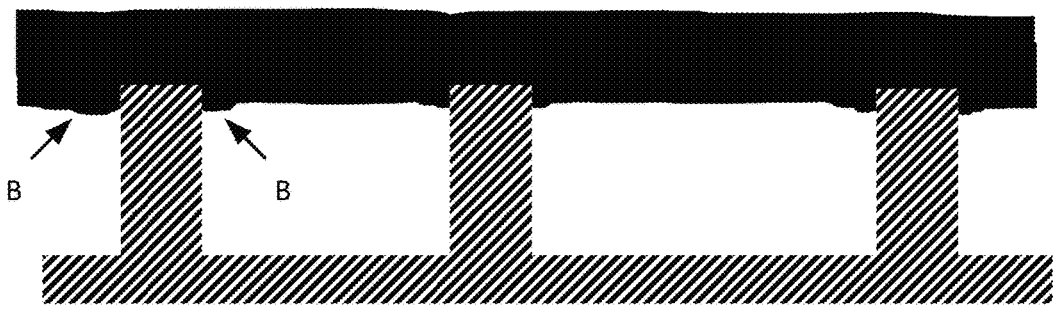
Figure 23:
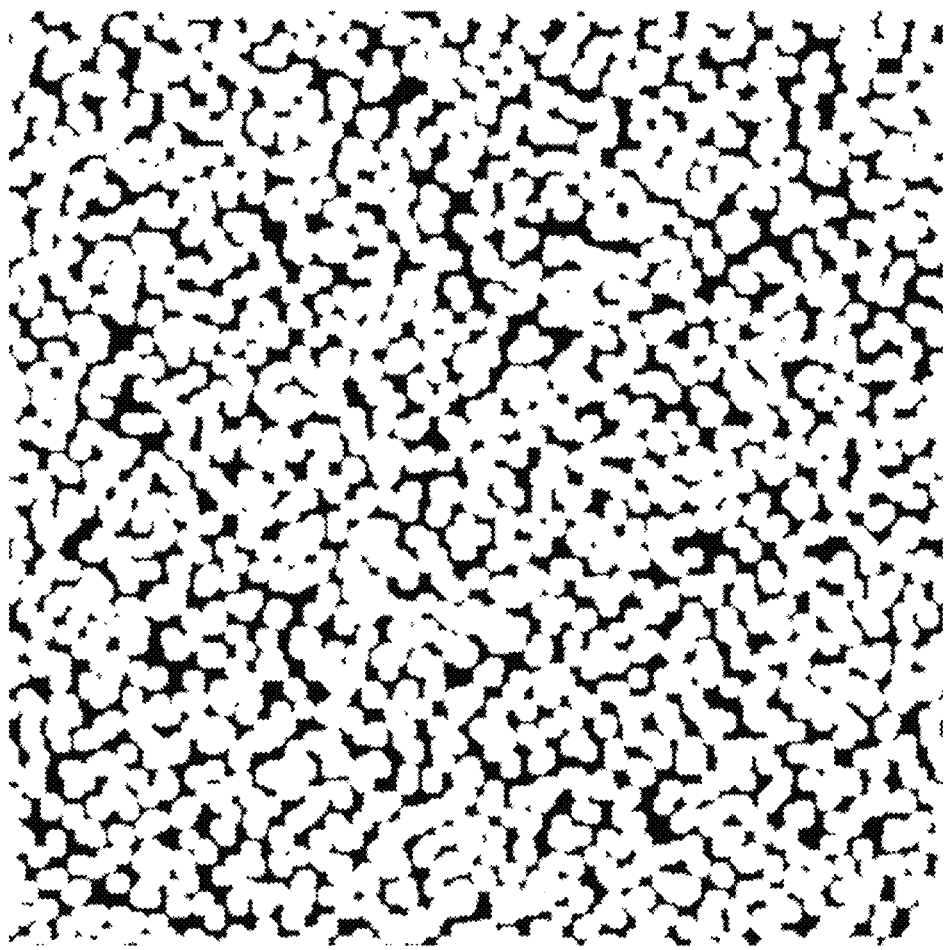
FIG. 23 shows a binary pattern of holes that, when used to shape a mold surface, leaves protrusions of fine dimensions remaining.
Figure 23A:
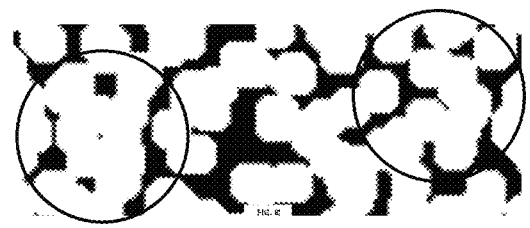
FIG. 23A is an enlarged excerpt from FIG. 23, showing some of the finely-dimensioned protrusions.
Figure 24A:
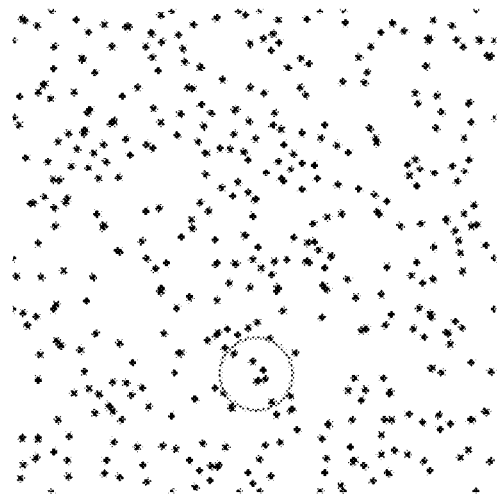
FIG. 24A shows a binary pattern.
Figure 24B:
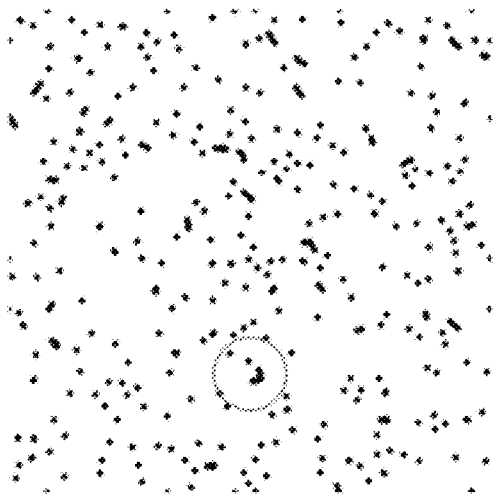
FIG. 24B shows the pattern after application of a dilation-erosion smoothing process.
Figure 25A:
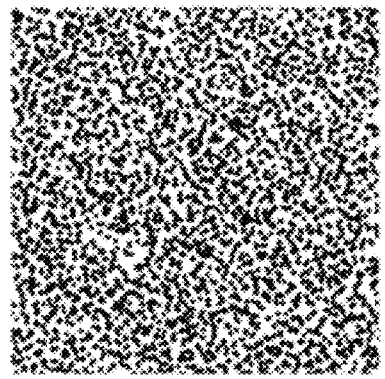
FIGS. 25A-25D show binary patterns resulting from application of dilation-erosion smoothing processes of different operator sizes.
Figure 25B:
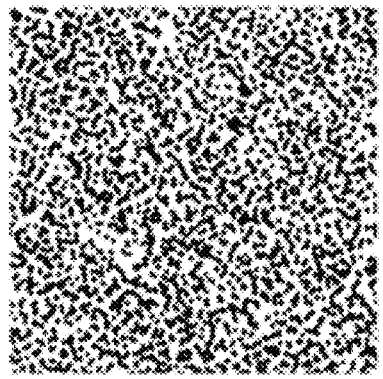
Figure 25C:
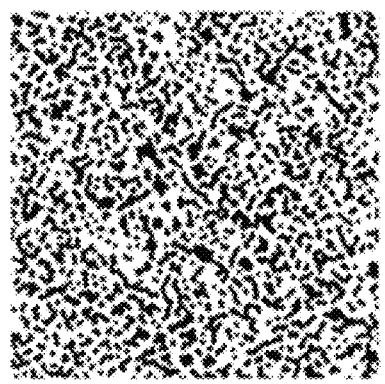
Figure 25D:
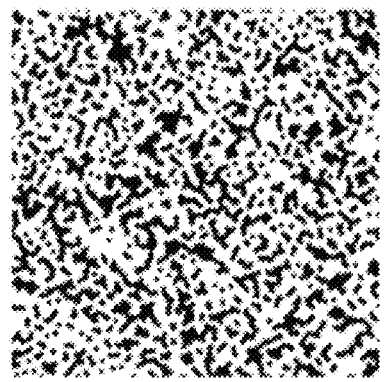

While the specification describes pressure-based molding methods, other means of applying a shaping force to a moldable plastic employ vacuum-based methods. Various such pressure- and vacuum-forming arrangements are shown in FIG. 13. Combinations thereof can also be employed, e.g., applying pressure to a plastic resin from above to press it towards a molding surface, and applying a vacuum to the opposite side to draw it towards the molding surface.

The detailed embodiments are applicable to various shaping techniques, such as thermoforming, injection molding, blow molding, rotational molding, etc. Moreover, various materials can be so-shaped, including polymethyl methacrylate (PMMA), polycarbonate (PC), polyethylene (PE), polypropylene (PP), polystyrene (PS), Polyethylene terephthalate (PET), high density polyethylene (HDPE), low density polyethylene (LDPE) and polyvinyl chloride (PVC), as well as other materials, such as fiber-reinforced composites, and metals.

Some element of trial and error is sometimes required when tailoring a plastic molding process to a particular set of application requirements. Guided by the teachings of applicant's disclosures, such procedure is within the capabilities of the artisan skilled in this field, and do not rise to the level of undue experimentation.

It should be understood that the arrangements detailed herein are well-suited to produce machine readable codes of essentially any type, including connected binary and Types 1, 2 and 3 watermark patterns, and 2D machine readable codes such as DataMatrix, Dotcode, QR code, and the sparse path codes detailed in application 63/240,821 and published international patent publication WO2021078842.

Again, it should be emphasized that the present disclosure builds on, and incorporates, the disclosures cited herein. For example, although not belabored, it will be understood that the pattern of protrusions or depressions formed by the detailed molding methods can correspond to marks comprising binary watermark patterns, as detailed in U.S. published patent applications 20190332840 and 20210299706. To make the protrusions and depressions more pronounced, a dilation operation can be applied to marks in patterns produced by such algorithms (while maintaining the same number of waxels per inch), in acknowledgement that some fidelity is lost in the plastic shaping process. For example, the mark areas can be dilated by 10%, 30%, 50% or even 100%.

The types of items that may be marked using the present technology is essentially without limit. Bottles, tubs, clamshell food containers, lids, trays, pouches, transport containers, bottles, etc., are just a few examples.

Thermoforming has a long and extensive literature, dating back to the 1930s and 1940s. See, e.g., U.S. Pat. Nos. 2,123,552, 2,142,445, 2,367,642 and 2,365,637—all to Edward Helwig. More recent examples include U.S. Pat. Nos. 3,733,309, 4,128,369, 4,423,000, 4,496,408, and 5,730,914.

While the specification focuses on molds for plastic containers, e.g., shaped with features formed by drilling and routing, the technology is not so limited. Removal of material from a mold in accordance with the present technology can be effected otherwise, such as by laser marking (etching), chemical treatments (such as acid etching), electrical discharge machining (so-called "spark erosion"), other forms of CNC machining, etc. And as noted, a mold can fashioned to have protrusions at locations where voids were formed in the earlier-detailed embodiments. (Watermark detectors used in plastic recycling applications are typically indifferent as to signal polarity, so "1"s and "0" s, and peaks/valleys, can be swapped without consequence.)

Although this specification has repeatedly referenced shaping plastic containers, it will be recognized that the technology can be used in connection with non-plastic items, such as glass, metal, paper, etc.

Although the technology has been illustrated with reference to binary patterns derived from continuous-tone patterns (e.g., formed by interpolating a payload pattern and summing with a reference signal pattern in a weighted sum), other techniques for forming continuous-tone patterns are known (e.g., from the cited documents). Similarly, binary patterns can be formed by methods other than those discussed above (e.g., again from the cited documents). Moreover, it is not essential that a binary pattern be formed of dots, pixels or stamps positioned in a cartesian coordinate system.

It will be understood that the data processing methods and algorithms detailed above can be executed using computer devices employing one or more processors, one or more memories (e.g. RAM), storage (e.g., a disk or flash memory), a user interface (which may include, e.g., a keypad, a TFT LCD or OLED display screen, touch or other gesture sensors, together with software instructions for providing a graphical user interface), interconnections between these elements (e.g., buses), and a wired or wireless interface for communicating with other devices.

The methods and algorithms detailed above can be implemented in a variety of different hardware processors, including a microprocessor, an ASIC (Application Specific Integrated Circuit) and an FPGA (Field Programmable Gate Array). Hybrids of such arrangements can also be employed.

By microprocessor, applicant means a particular structure, namely a multipurpose, clock-driven integrated circuit that includes both integer and floating point arithmetic logic units (ALUs), control logic, a collection of registers, and scratchpad memory (aka cache memory), linked by fixed bus interconnects. The control logic fetches instruction codes from an external memory, and initiates a sequence of operations required for the ALUs to carry out the instruction code. The instruction codes are drawn from a limited vocabulary of instructions, which may be regarded as the microprocessor's native instruction set.

A particular implementation of one of the above-detailed processes on a microprocessor—such as selecting marks in clustered arrangement—involves first defining the sequence of algorithm operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

Many microprocessors are now amalgamations of several simpler microprocessors (termed "cores"). Such arrangement allows multiple operations to be executed in parallel. (Some elements—such as the bus structure and cache memory may be shared between the cores.)

Examples of microprocessor structures include the Intel Xeon, Atom and Core-I series of devices, and various models from ARM and AMD. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data. Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of certain of the detailed algorithms, due to the nature of the data being processed, and the opportunities for parallelism.

While microprocessors can be reprogrammed, by suitable software, to perform a variety of different algorithms, ASICs cannot. While a particular Intel microprocessor might be programmed today to select mark locations in clusters, and programmed tomorrow to prepare a user's tax return, an ASIC structure does not have this flexibility. Rather, an ASIC is designed and fabricated to serve a dedicated task. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of watermark detectors and decoders offer higher performance, and consume less power, than implementations employing microprocessors. A drawback, however, is the significant time and expense required to design and fabricate circuitry that is tailor-made for one particular application.

A particular implementation of any of the above-referenced processes using an ASIC again begins by defining the sequence of operations in a source code, such as MatLab or C++. However, instead of compiling to the native instruction set of a multipurpose microprocessor, the source code is compiled to a "hardware description language," such as VHDL (an IEEE standard), using a compiler such as HDL-Coder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to execute the above-detailed algorithms is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, an external memory. By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Likewise with A/D and D/A converters. Again, the reconfigurable interconnect that characterizes FPGAs enables such additional elements to be incorporated at desired locations within a larger circuit.

Examples of FPGA structures include the Stratix FPGA from Intel, and the Spartan FPGA from Xilinx.

As with the other hardware structures, implementation of the above-detailed processes on an FPGA begins by describing a process in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the detailed algorithms. One employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Still another type of processor hardware is a neural network chip, e.g., the Intel Nervana NNP-T, NNP-I and Loihi chips, the Google Edge TPU chip, and the Brainchip Akida neuromorphic SOC.

Software instructions for implementing the detailed functionality on the selected hardware can be authored by artisans without undue experimentation from the descriptions provided herein, e.g., written in C, C++, Visual Basic, Java, Python, Tcl, Perl, Scheme, Ruby, Caffe, TensorFlow, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. Different tasks can be performed exclusively by one device or another, or execution can be distributed between devices. In like fashion, description of data being stored on a particular device is also exemplary; data can be stored anywhere: local device, remote device, in the cloud, distributed, etc.

This specification has discussed various embodiments. It should be understood that the methods, elements and concepts detailed in connection with one embodiment can be combined with the methods, elements and concepts detailed in connection with other embodiments. While some such arrangements have been particularly described, many have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the invention.

The invention claimed is:

1. A method comprising: introducing plastic into a mold that defines plural cavities, and removing from the mold a shaped item that has plural indentations, rather than protrusions, at locations corresponding to said plural mold cavities.

2. The method of claim 1 in which a majority of said plural cavities have opening dimensions of at least 100 microns.

3. The method of claim 1 wherein the mold comprises a mold surface with said plural cavities defined therein, and the item shaped by the mold includes an item surface that faced said mold surface, wherein an area of the item surface that faced a cavity in the mold surface lacks a reciprocal protrusion but instead comprises an indentation.

4. A method comprising: introducing plastic into a mold that defines plural cavities, and removing from the mold a shaped item that has plural indentations, rather than protrusions, at locations corresponding to said plural mold cavities, wherein the cavities include cavities having opening dimensions of 160 microns or less, and said cavities having opening dimensions of 160 microns or less span, in aggregate, a majority of total surface area spanned by all cavities.

5. A method comprising: introducing plastic into a mold that defines plural cavities, and removing from the mold a shaped item that has plural indentations, rather than protrusions, at locations corresponding to said plural mold cavities, wherein the plural cavities correspond to a 2D code comprised of marks at locations within an N×N array of locations, wherein the cavities are placed at positions corresponding to between 5% and 20% of said N×N locations.

6. A method comprising: introducing plastic into a mold that defines plural cavities, and removing from the mold a shaped item that has plural indentations, rather than protrusions, at locations corresponding to said plural mold cavities, wherein:
the plastic comprises HDPE or LDPE;
the cavities include cavities having opening dimensions of 100-160 microns, and said cavities having opening dimensions of 100-160 microns span, in aggregate, a majority of total surface area spanned by all cavities of said mold; and
the method comprises extrusion blow molding, with a blowing pressure of 3-6 bars.

7. A method comprising the acts: introducing plastic, other than polyethylene terephthalate (PET) or polypropylene (PP), into a mold, said mold having a mold surface that defines plural mold cavities having opening dimensions of 240 microns or less, the mold surface having a surface roughness of less than 1.6 microns, the method including urging the plastic against the mold surface with a molding pressure of 1.5-10 bars, and removing from the mold a molded item having an item surface that faced the mold surface, said item surface having plural indentations, rather than protrusions, at locations corresponding to said plural mold cavities.

8. The method of claim 7 in which the method employs an extrusion blow-molding process.

9. The method of claim 7 in which the plastic is high density polyethylene (HDPE) or low density polyethylene (LDPE).

10. The method of claim 7 in which the opening dimensions of said plural mold cavities are 180 microns or less.

11. The method of claim 7 in which the opening dimensions of said plural mold cavities are 85 microns or more.

12. The method of claim 7 in which the molding pressure is 3-6 bars.

13. The method of claim 7 in which a cooling temperature applied to the plastic after molding is 10°-20° C.

14. The method of claim 7 in which a cooling temperature is applied to the plastic after molding for a cooling interval of 2-5 seconds.

15. The method of claim 7 in which an extrusion head temperature is 180°-220° C.

16. The method of claim 7 in which the mold includes a mold cavity having a diameter and a depth, where the depth exceeds 20% of the diameter, or exceeds 20 microns.

17. The method of claim 7 in which said plural mold cavities include a cavity having an irregular shape.

18. The method of claim 7 in which said plural indentations define a 2D machine readable code.

19. The method of claim 7 in which mold cavities having opening dimensions of less than 200 microns span, in aggregate, 51% or more of a total mold surface area spanned by all cavities.

20. The method of claim 7 in which mold cavities having opening dimensions of at least 100 microns span, in aggregate, 75% or more of a total mold surface area spanned by all cavities.

21. The method of claim 7 in which the item comprises a bottle, a tub, a clamshell food container, a lid, a tray, a pouch, or a transport container.

22. The method of claim 7 wherein an area of the item surface that faced a cavity in the mold surface lacks a reciprocal protrusion but instead comprises an indentation.

* * * * *